US008602874B2

(12) United States Patent
Rowe et al.

(10) Patent No.: US 8,602,874 B2
(45) Date of Patent: Dec. 10, 2013

(54) CASHLESS INSTRUMENT BASED TABLE GAME PROMOTIONAL SYSTEM AND METHODOLOGY

(75) Inventors: Richard E. Rowe, Incline Village, NV (US); David C. Durst, Reno, NV (US)

(73) Assignee: IGT, Reno, NV (US)

( * ) Notice: Subject to any disclaimer, the term of this patent is extended or adjusted under 35 U.S.C. 154(b) by 1248 days.

(21) Appl. No.: 11/154,833

(22) Filed: Jun. 15, 2005

(65) Prior Publication Data

US 2005/0266919 A1    Dec. 1, 2005

(51) Int. Cl.
G06F 17/00    (2006.01)

(52) U.S. Cl.
USPC .............................. 463/25; 463/29; 705/14.1

(58) Field of Classification Search
USPC .......... 463/25, 29, 43; 705/14.1, 14.37, 14.38
See application file for complete search history.

(56) References Cited

U.S. PATENT DOCUMENTS

| | | | |
|---|---|---|---|
| 5,038,022 A | 8/1991 | Lucero | |
| 5,083,271 A | 1/1992 | Thacher et al. | |
| 5,119,295 A | 6/1992 | Kapur | |
| 5,265,874 A | 11/1993 | Dickinson et al. | |
| 5,429,361 A | 7/1995 | Raven et al. | |
| 5,457,305 A | 10/1995 | Akel et al. | |
| 5,471,669 A | 11/1995 | Lidman | |
| 5,544,086 A | 8/1996 | Davis et al. | |
| 5,559,312 A * | 9/1996 | Lucero | 463/25 |
| 5,613,912 A | 3/1997 | Slater | |
| 5,643,086 A | 7/1997 | Alcorn et al. | |
| 5,651,548 A | 7/1997 | French et al. | |
| 5,735,742 A | 4/1998 | French | |
| 5,761,647 A * | 6/1998 | Boushy | 705/10 |
| 5,762,552 A | 6/1998 | Vuong et al. | |
| 5,768,382 A | 6/1998 | Schneier et al. | |
| 5,770,533 A | 6/1998 | Franchi | |
| 5,790,677 A | 8/1998 | Fox et al. | |
| 5,871,398 A | 2/1999 | Schneier et al. | |
| 5,937,066 A | 8/1999 | Gennaro et al. | |

(Continued)

FOREIGN PATENT DOCUMENTS

| | | |
|---|---|---|
| AU | 2002/8891 | 11/2000 |
| CA | 2407552 | 11/2001 |

(Continued)

OTHER PUBLICATIONS

Final Office Action from related U.S. Appl. No. 10/406,911, dated Jan. 22, 2007, 24 pages.

(Continued)

*Primary Examiner* — Michael Cuff
(74) *Attorney, Agent, or Firm* — Foley & Lardner LLP

(57) ABSTRACT

Systems and methods for transacting ticket vouchers and other suitable cashless instruments at gaming tables are disclosed. A network interface to a cashless instrument transaction clearinghouse can facilitate communications across disparate units and gaming properties to enable the automated validation, acceptance and tracking of cashless instruments at both a given site and across a WAN. Cashless instrument transactions at gaming tables can include ticket to gaming chip and gaming chip to ticket conversions, and can be made involving automated validation, acceptance, storage and tracking of cashless instruments having associated monetary and/or promotional values. Softcount procedures are adjusted to include more readily traceable cashless instruments. Cashless instrument promotional values can include courtesy "roundups" of monetary amounts, as well as general and specific gaming table promotions to encourage play across many different casino gaming venues.

27 Claims, 9 Drawing Sheets

(56) References Cited

U.S. PATENT DOCUMENTS

| | | | |
|---|---|---|---|
| 5,970,143 | A | 10/1999 | Schneier et al. |
| 6,012,832 | A | 1/2000 | Saunders et al. |
| 6,019,283 | A | 2/2000 | Lucero |
| 6,048,269 | A | 4/2000 | Burns et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,113,495 | A | 9/2000 | Walker et al. |
| 6,149,522 | A | 11/2000 | Alcorn et al. |
| 6,154,543 | A | 11/2000 | Baltzley |
| 6,165,072 | A | 12/2000 | Davis et al. |
| 6,178,510 | B1 | 1/2001 | O'Connor et al. |
| 6,183,362 | B1 | 2/2001 | Boushy |
| 6,267,671 | B1 | 7/2001 | Hogan |
| 6,302,793 | B1 | 10/2001 | Fertitta, III et al. |
| 6,368,219 | B1 | 4/2002 | Szrek et al. |
| 6,394,907 | B1 | 5/2002 | Rowe |
| 6,500,067 | B1 | 12/2002 | Luciano et al. |
| 6,508,709 | B1 | 1/2003 | Karmarkar |
| 6,511,377 | B1 | 1/2003 | Weiss |
| 6,560,581 | B1 | 5/2003 | Fox et al. |
| 6,582,310 | B1 | 6/2003 | Walker et al. |
| 6,678,664 | B1 | 1/2004 | Ganesan |
| 6,682,421 | B1 | 1/2004 | Rowe et al. |
| 6,739,972 | B2 * | 5/2004 | Flanagan-Parks et al. ..... 463/25 |
| 6,852,031 | B1 | 2/2005 | Rowe |
| 6,866,586 | B2 | 3/2005 | Oberberger et al. |
| 7,419,428 | B2 | 9/2008 | Rowe |
| 2001/0032878 | A1 | 10/2001 | Tsiounis et al. |
| 2002/0032656 | A1 | 3/2002 | Chen |
| 2002/0045477 | A1 | 4/2002 | Dabrowski |
| 2002/0071557 | A1 | 6/2002 | Nguyen |
| 2002/0077178 | A1 | 6/2002 | Oberberger et al. |
| 2002/0082076 | A1 | 6/2002 | Roser et al. |
| 2002/0128059 | A1 | 9/2002 | Baltz et al. |
| 2003/0027635 | A1 | 2/2003 | Walker et al. |
| 2003/0036425 | A1 | 2/2003 | Kaminkow et al. |
| 2003/0050831 | A1 | 3/2003 | Klayh |
| 2003/0064769 | A1 * | 4/2003 | Muir ............................... 463/16 |
| 2003/0171145 | A1 | 9/2003 | Rowe |
| 2003/0216967 | A1 * | 11/2003 | Williams ........................ 705/14 |
| 2006/0016883 | A1 | 1/2006 | Silva et al. |
| 2007/0060274 | A1 | 3/2007 | Rowe et al. |

FOREIGN PATENT DOCUMENTS

| | | |
|---|---|---|
| DE | 3441518 A1 | 5/1986 |
| DE | 44 22 370 A1 | 4/1996 |
| EP | 0744786 | 11/1996 |
| EP | 0 805 424 A2 | 5/1997 |
| EP | 0933717 | 8/1999 |
| EP | 1351180 | 10/2003 |
| GB | 2 151 061 | 7/1985 |
| WO | WO 95/24689 | 9/1995 |
| WO | WO 99/01188 | 1/1999 |
| WO | WO 99/23594 | 5/1999 |
| WO | WO 99/45652 | 9/1999 |
| WO | WO 00/38088 | 6/2000 |
| WO | WO 00/49547 | 8/2000 |
| WO | 01/84516 A2 | 8/2001 |
| WO | 01/76710 A2 | 10/2001 |
| WO | WO 01/76710 | 10/2001 |
| WO | WO 02/32520 | 4/2002 |
| WO | WO 03/044746 | 5/2003 |
| WO | WO2004/090818 | 10/2004 |
| WO | WO 2004/090818 | 10/2004 |
| WO | WO 2005/022453 | 3/2005 |
| WO | WO 2006/110747 | 10/2006 |

OTHER PUBLICATIONS

Examination Report from corresponding Foreign Application No. 01 928 944.6, dated Nov. 17, 2006, 7 pages.
European Patent Examination Report dated Jan. 11, 2006 from related European Patent Application No. 04 749 734.2-2221, 5 pages.
Office Action dated Apr. 18, 2006 from related U.S. Appl. No. 10/406,911, 24 pages.
International Search Report dated Aug. 8, 2003, from related Foreign Patent Application No. PCT/US 02 3639, 3 pages.
International Search Report dated, Jan. 12, 2004, from related Foreign Patent Application No. PCT/US2004/010359, 4 pages.
Written Opinion of the International Searching Authority, dated Jan. 12, 2004, from related International Application No. PCT/US2004/010359, 7 pages.
European Patent Examination Report dated Nov. 22, 2002, from related Foreign Patent Application No. 01 13629, 2 pages.
Final Office Action from related U.S. Appl. No. 09/993,163, dated Jun. 23, 2004, 5 pages.
Office Action from related U.S. Appl. No. 09/993,163, dated Jan. 21, 2004, pp. 1-21.
Summons to Attend Oral Proceedings pursuant to Rule 71(1) EPC, dated Sep. 29, 2006, from related European Patent Application No. 047439734.2, 12 pages.
Written Opinion of the International Searching Authority, dated Oct. 14, 2005, from related International Application No. PCT/US2004/010359, 8 pages.
Schneier B., "Applied Cryptography, Second Edition", 1996, Applied Cryptography. Protocols, Algorithms, and Source Code in C, pp. 31-38, 50-51, XP002248999, ISBN: 0-471-11709-9.
"Introduction to Public-Key Cryptography," http://developer.netscape.com/docs/manuals/security/-pkin/contents.htm, Oct. 9, 1998, downloaded from the Internet on Jan. 8, 2004, pp. 1-20.
U.S. Appl. No. 09/631,855, filed Aug. 3, 2000.
U.S. Appl. No. 10/898,600, filed Jul. 22, 2004.
Examination Report from Corresponding Australian Application No. 2006203189, dated Oct. 17, 2007, 2 pages.
Final Office Action from U.S. Appl. No. 10/406,911, dated Sep. 12, 2007, 18 pages.
International Search Report and Written Opinion dated Feb. 14, 2008 from PCT Application No. PCT/US06/21422, 9 pages.
International Search Report and Written Opinion dated Feb. 14, 2008 from related PCT Application No. PCT/US2006/021422, 9 pages.
Notice of Allowance and Allowed Claims dated Jun. 9, 2008 from related U.S. Appl. No. 10/406,911, 15 pages.
European Office Action dated Feb. 9, 2009 from Application No. 02803653.1, 5 pgs.
Canadian Office Action dated Jan. 28, 2009 from Application No. 2,467,075. 3 pgs.
EP Oral Proceedings Summons dated Dec. 16, 2008 from Application No. 01928944.6, 6 pgs.
International Search Report dated Mar. 28, 2008 from PCT Application No. PCT/US2007/081660.
Examination Report dated May 12, 2009 from Australian Patent Application No. 2004227884.
Statement of Grounds and Particulars dated Jun. 15, 2009 from Australian Patent Application No. 2006203189.
Statement of Grounds and Particulars dated Jul. 8, 2009 from Australian Patent Application No. 2002366161.
Office Action dated Feb. 24, 2010 issued in Canadian Patent Application No. 2,467,075.
Canadian Office Action dated Apr. 14, 2010 from Application No. 2,407,552.
U.S. Office Action dated Jul. 23, 2010 from U.S. Appl. No. 11/584,152.
Examination Report dated Aug. 19, 2010 for Australian Application No. 2004227884.
AU Examination Report dated Aug. 19, 2010 issued in AU 2004227884.
CA Office Action dated Nov. 21, 2011 issued in Application No. 2,521,225.
Engelschall, Ralf S., "Portable Multithreading: the signal stack trick for user-space thread creation," 2000 USENIX Annual Conference, Jun. 18-23, 2000 San Diego, California, USA. 12 pps.
Office Action regarding Canadian Application No. 2,521,225, mail date Jul. 22, 2013, 6 pps.

* cited by examiner

CASHLESS INSTRUMENT BASED TABLE GAME PROMOTIONAL SYSTEM AND METHODOLOGY

CROSS-REFERENCE TO RELATED APPLICATION

The present application is a continuation-in-part of and claims priority to co-pending U.S. patent application Ser. No. 10/406,911 by Rowe, and entitled "Cashless Transaction Clearinghouse," filed Apr. 2, 2003, which is commonly assigned and which is incorporated by reference herein in its entirety and for all purposes.

TECHNICAL FIELD

The present invention relates generally to casino gaming, and more specifically to systems and methods for conducting transactions at table games and other activities on the floor of a casino or other gaming establishment.

BACKGROUND

Casinos and other forms of gaming comprise a growing multi-billion dollar industry that has experienced many changes and innovations in recent years. While gaming machines have become a staple for many casinos and gaming establishments, table games remain an immensely popular form of gaming and a substantial source of revenue for gaming operators as well. Such table games can include poker, blackjack, craps, roulette and other traditional standbys, as well as other more recently introduced games such as pai-gow, Carribean Stud, Spanish 21, and Let It Ride, among others. Under a typical gaming event at a gaming table, a player places a wager on a game, whereupon a winning may be paid to the player depending on the outcome of the game. As is generally known, a wager may involve the use of cash or one or more chips, markers or the like, as well as various forms of gestures or oral claims. The game itself may involve the use of, for example, one or more cards, dice, wheels, balls, tokens or the like, with the rules of the game and any payouts or pay tables being established prior to game play. As is also known, possible winnings may be paid in cash, credit, one or more chips, markers, or prizes, or by other forms of payouts.

Various systems and methods for operating the floor of a casino or gaming establishment with its table game regions or "pits" have evolved gradually over the years, with innovations such as card shufflers, multi-deck shoes, and improved security cameras and systems all being introduced at times to better the manageability and efficiency of the gaming and floor operations processes. As technology in the gaming industry progresses in general, improvements have also been made with respect to gaming machines and related systems. For instance, traditional methods of dispensing coins or tokens as awards for winning game outcomes at gaming machines are being supplemented by ticket dispensers that print ticket vouchers that may be exchanged for cash or accepted as credit of indicia in other gaming machines for additional game play. An award ticket system, which allows award ticket vouchers to be dispensed and utilized by gaming machines, increases the operational efficiency of maintaining a gaming machine and simplifies the player pay out process. An example of an award ticket system is the EZ Pay® ticket system by IGT of Reno, Nev. Award ticket systems and systems using other cashless mediums are referred to as cashless systems.

Cashless systems, such as the EZ Pay® ticket system, provide advantages to both game players and casino operators. For example, many players find it more convenient to carry an award ticket than a large number of coins. For gaming machine operators, cashless systems tend to reduce gaming machine operating costs. For example, the infrastructure needed to remove and count indicia of credit (e.g., coins, tokens, bills) from the gaming machine may be eliminated or minimized when it is replaced with a cashless system, which reduces the gaming machine operating costs. Further, coin dust, which is potentially damaging to the components of the gaming machine (e.g., electronic components), may be eliminated or minimized when coin acceptors are replaced with the cashless system. Other advantages that can be obtained through the use of such cashless systems have also been devised, such as, for example, those disclosed in the priority application incorporated above. Unfortunately, such cashless systems are typically designed for and implemented with gaming machine systems, such that their benefits have not really been recognized at gaming tables.

In addition, there are numerous gaming promotions, and in particular table game promotions, that are used in the casino industry today. Included in such table game promotions are various forms of giveaway or bet matching coupons, such as, for example, a $5 match coupon for a $5 bet at a single table game play, whereby a player can win $10 for a $5 bet, or simply lose the $5 bet depending upon the outcome of the game. In either event, the coupon or promotional item is then taken away by the table dealer or other casino personnel after the single game play. These promotional items tend to be in the form of newspaper cutouts, coupons, mailers, other mass produced paper items and the like, and there is typically no form of validation and no form of automated tracking for such promotional items. Although such coupons and other paper items might be tracked manually by casino personnel, such endeavors can be inconvenient and time consuming. Furthermore, there are typically few or no measures used to authenticate or validate such table based promotional offers.

With respect to gaming machines and table games, it is generally known within the industry that many gaming patrons prefer one form of gaming over the other, and that a significant number of patrons tend to play only one or the other. For example, some gaming players prefer the anonymity and isolation of gaming machines, and also tend to be intimidated by the generally open and social nature of table games. Further, because such players tend to play little to no table games, such table games can be even more intimidating in that many have rules, procedures and payouts that may be unknown or unfamiliar to such players. Because many gaming patrons can be especially disinclined to play games that are unfamiliar to them, there might generally be little incentive for a player who mostly plays gaming machines to play table games or to try new table games.

Accordingly, not only do needs exist to enable broader abilities with respect to cashless transactions at gaming tables and the tracking of such cashless transactions and table game promotions in a more reliable and efficient manner, but there is also a need to motivate some players to try new table games or to try table games in general. Although existing systems and methods for providing cashless transactions and for providing and tracking table game promotions may have been adequate in the past, improvements to such existing systems and methods are usually encouraged. It is thus desirable to provide such improvements, and in particular for such systems and methods to involve the expanded use of cashless instruments with respect to gaming tables, along with the use of more automated features and functions, such as those found with respect to the EZ Pay® ticket system or other cashless instrument systems.

SUMMARY

It is an advantage of the present invention to provide systems and methods that can permit a broader range of transactions at gaming tables involving cashless instruments, that better validate and track promotional offers at gaming tables, and that promote table games in general and otherwise motivate players to try and play more types of table games. This is accomplished by providing at least an interface to an automated cashless instrument system, such as the EZ Pay® ticket system, as well as added software, system devices and infrastructure adapted to support expanded ticket system uses involving gaming tables and associated promotions. Some embodiments can even involve an entire improved automated cashless instrument system adapted to support cashless transactions and related promotions at gaming tables. The resulting systems and methods can then be used to provide new or improved services to players, such as the ability to convert tickets to gaming chips and vice-versa, as well as automated and tracked table game specific promotions.

One aspect of the present invention provides a cashless instrument transaction clearinghouse for facilitating the use of cashless instruments across separate gaming properties, each of which generates and validates cashless instruments. The cashless instrument transaction clearinghouse may be generally characterized as comprising: a) a network interface allowing the cashless instrument transaction clearinghouse to communicate with each of the separate gaming properties; and b) a processor configured or designed to: (i) receive cashless instrument validation requests via the network interface from a first property for a cashless instrument presented at the first property where the cashless instrument was generated at a second property (ii) send information, via the network, to the second property requesting the second property to approve or reject the cashless instrument validation request, iii) validate cashless instrument storing a promotion. A cashless instrument validation request received at the clearinghouse may be for validating an indicia of credit value to enable one or more of: i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof. The cashless instrument may be selected from the group consisting of a smart card, a debit card, a barcoded ticket, a magnetic striped card and an EZ Pay® ticket voucher.

In particular embodiments, the cashless instrument storing the promotion may be redeemable for one of game play credits, merchandise and combinations thereof. Further, the cashless instrument storing the promotion may be generated at a gaming machine, gaming table or other issuing location at a first property and redeemed at a gaming machine, gaming table or other redemption or crediting location at the first property or a second separate property, if desired. The promotion may be offered according to one or more promotion theme parameters. A first promotion theme parameter may be related to game play on of a specific type of gaming machine or gaming table. The cashless instrument storing the promotion might in some cases only be redeemable at a specific property or a specific type of table game connected to or associated with the cashless instrument transaction clearinghouse. The cashless instrument transaction clearinghouse may further comprise a database for storing promotion theme parameters, statistics and various related data.

In some embodiments, a relevant processor may be further designed or configured to generate a cashless transaction thread comprising a plurality of related cashless instrument transactions and provide the promotion in response to properties of the cashless transaction thread matching one or more promotion theme parameters. The promotion theme parameters can be one or more of: i) a threshold amount spent on game play, ii) a threshold amount spent on food purchases, iii) a threshold amount spent on merchandise purchases, iv) a threshold amount spent on service purchases, v) a threshold amount spent on rental purchases, vi) a random selection of the cashless instrument thread, vii) a time, viii) a gaming property location, ix) a courtesy roundup value commensurate with an actual monetary amount on a ticket and/or the type of table game or gaming table at the point of redemption, x) a gaming property designated promotion relating to table games and/or a specific type of table game, and xi) combinations thereof, among others. The properties of the cashless instrument thread may be one or more of: i) a total amount spent on game play for the cashless instrument transactions comprising the cashless instrument thread, ii) a total amount spent on food purchases for the cashless instrument transactions comprising the cashless instrument thread, iii) a total amount spent on merchandise purchases for the cashless instrument transactions comprising the cashless instrument thread, iv) a total amount spent on service purchases for the cashless instrument transactions comprising the cashless instrument thread, v) a total amount spent on rental purchases for the cashless instrument transactions comprising the cashless instrument thread, vi) a total amount spent on courtesy roundup or other promotional values provided for the cashless instrument transactions comprising the cashless instrument thread, and vii) combinations thereof, among others.

The cashless instrument transaction clearinghouse may further comprise a transaction database including cashless transaction thread information. Where more than one of multiple property information sets, multiple player information sets, table game information, gaming machine information, promotional information and/or other associated information sets are to be stored, this transaction database can be partitioned accordingly. Such database partitions can be made with respect to properties or ownership of properties, players, groups of players, gaming machines, gaming tables, types of games, and promotion types, among other classifications.

In some embodiments, the generation of a promotion at the clearinghouse may comprise one of initiating: i) a download of promotional credits, ii) an issuance of a comp, iii) an issuance of a discount coupon, iv) an issuance of a cash award, v) an issuance of an express roundup value and vi) combinations thereof. The promotional credits may be non-cashable credits. The promotional credits, the comp, the discount coupon, the cash award, the express roundup value and combinations thereof may be stored on a first cashless instrument generated at a cashless instrument generation site in communication with the cashless instrument transaction clearinghouse or may be stored in a user account. The promotional credits, the comp, the discount coupon, the cash award, the express roundup value and combinations thereof that are stored on the first cashless instrument or stored in the user account might be redeemable at a single gaming property or gaming table, or might be redeemable at a plurality of gaming properties or gaming tables. The clearinghouse may be capable of receiving cashless instrument validation requests for a validation of the promotional credits, the comp, the discount coupon, the cash award, the express roundup value and combinations thereof stored on the first cashless instrument or stored in the user account.

When validation of a cashless instrument storing a promotion is approved, the cashless instrument may be used to redeem one of promotional credits, a comp, a discount coupon, merchandise and combinations thereof. The promotional credits may be non-cashable credits. In a specific embodiment, the cashless instrument storing the promotion may be only redeemable at a specific property. Another aspect of the invention pertains to computer program products including a machine-readable medium on which is stored program instructions for implementing any of the methods described above. Any of the methods of this invention may be represented as program instructions and/or data structures, databases, and the like that can be provided on such computer readable media.

Still further embodiments of the present invention can include systems, networks and methods adapted for use in conjunction with live table games and other types of non-gaming machine gaming venues involving the acceptance of cashless instruments for both buy ins of gaming chips and other promotional offers at such table games and other gaming venues. Similar to the foregoing embodiments, such gaming table and other venue based embodiments can include a cashless instrument transaction clearinghouse adapted to facilitate the use of cashless instruments at one or more gaming properties adapted to generate and accept cashless instruments. Network interfaces, processors and transaction databases may all be similarly included as part of such an alternative venue based cashless instrument transaction clearinghouse. In some embodiments, such a clearinghouse and associated network or system may be used to support both gaming machine based cashless instrument transactions and non-gaming machine based cashless instrument transactions.

In addition, a plurality of cashless interface devices adapted for use at such gaming table or other alternative gaming venues can also be provided. Such cashless interface devices can be in communication with the clearinghouse or other suitable server or processor, and can also be adapted to validate cashless instruments thereupon, communicate cashless instrument information to an appropriate clearinghouse, server, processor and/or database, facilitate the conversion of cashless instruments to gaming chips, and also facilitate the redemption and tracking of one or more promotional offers. Such cashless interface devices can also facilitate the offering and tracking of a table game roundup promotion, where such a roundup promotion involves giving a player gaming chips having a monetary value greater than the monetary value set forth on the cashless instrument tendered by the player.

In some embodiments, various methods of providing cashless instrument related promotions at gaming tables are provided. Such methods can include the steps of accepting a cashless instrument from a player at a gaming table and reading the cashless instrument using an automated cashless interface device located at or in close proximity to the gaming table, where such a reading involves a machine readable portion of the cashless instrument, such as a bar code. Additional steps can include validating the cashless instrument based on such a machine readable portion, assigning a promotional monetary value to the cashless instrument, and providing to the player at the gaming table one or more items or gestures reflecting such a promotional monetary value. Such a promotional monetary value can be in addition to any actual negotiable cash value that may be attributable to the cashless instrument. Further, such items or gestures reflecting the promotional value can include gaming chips or markers, as well as promotional bets or conventional gestures or positioning of items reflecting such promotional bets or similar values.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and elements for the disclosed systems and methods involving cashless instrument transactions at gaming tables. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

In general, the present invention relates to systems and methods involving cashless instrument transactions at gaming tables. A broader range of transactions at gaming tables can take place where such cashless instruments can be used, with some examples involving the types of cash vouchers and other paper tickets that can be generated by the EZ Pay® ticket system or other similar ticket systems. Such systems can produce cash vouchers and other paper tickets that can be validated and tracked in a more automated fashion. Advantages can include the ability to convert cash vouchers to gaming chips and vice-versa at gaming tables, new types of table game promotions, and a more reliable way of tracking table game specific promotions, among others. The remainder of the detailed description that follows first describes general gaming machines and cashless instrument systems, such as those involving cashless instrument transaction clearinghouses, cash vouchers and other printed tickets. Subsequently, general cashless instrument transaction processes are described, after which more specific gaming table based cashless instrument transactions are provided. Finally, various cashless instrument based table game promotions are disclosed.

Gaming Machines

Figure 1:
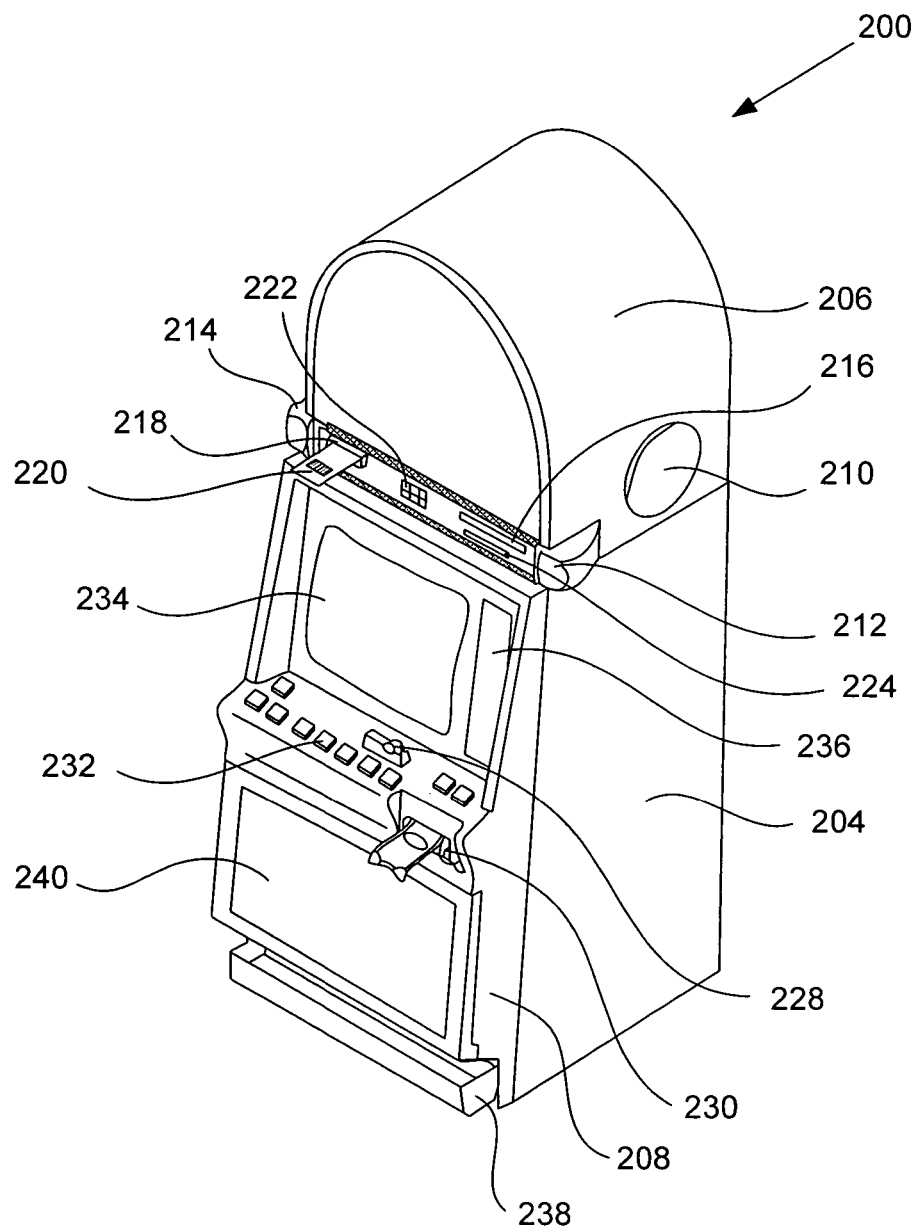
FIG. 1 is a perspective drawing of a gaming machine having a top box and other devices.

Turning first to FIG. 1, a gaming machine 200 of the present invention is shown. Gaming machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 251. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided by gaming machine 200

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print barcoded or other forms of paper tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the gaming machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention can be deployed on or used with respect to virtually any form of cash vouchers or paper ticket systems from most any gaming machine now available or hereafter developed.

Returning to the example of FIG. 1, when a user wishes to play the gaming machine 200, he or she can insert cash through the coin acceptor 228 or bill validator 230. In addition, the player may use a cashless instrument of some type to register credits on the gaming machine 200. For example, the bill validator 230 may accept a printed ticket voucher, such as barcoded ticket 220, as an indicia of credit. As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, such as, for example, a first casino where the gaming machine 200 is located, or the ticket may have been generated at another property, such as, for example, a second casino. Details of the components of a cashless system and validation methods used in a preferred embodiment of a cashless system are described with reference to FIGS. 2-7.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner, among other informational items. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200, or at an associated table game. The promotional prize may involve multiple properties, gaming machines in general, particular types of gaming machines, table games in general and/or specific types of table games.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique barcode may be printed on the ticket voucher, which barcode may be read with a barcode scanner to obtain information from the ticket. The ticket voucher, such as barcoded ticket 220, may be printed from a printer, such as gaming machine printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM like terminals, at a cashier station when a player cashes out or prepaid smart cards or debits may be purchased within the gaming property (e.g., a casino).

During the course of a game at a gaming machine 200, a player may be required to make a number of decisions that affect the outcome of the game. For example, a player may vary his or her wager on a particular game, select a prize for a particular game, or make other game decisions that affect the outcome of a particular game. The player may make these choices using the player-input switches 232, the video display screen 234 or using some other device that enables a player to input information into the gaming machine. During certain game events, the gaming machine 200 may display visual and auditory effects that can be perceived by the player. These effects can add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cash out and may receive a barcoded printed ticket 220 from the printer 218, which ticket may be used for further games, to cash out for currency and/or to redeem a prize. Further, the player may receive from printer 218 a separate ticket for food, merchandise, game services or other promotions that may be used at the gaming property where the gaming machine is located and/or at other gaming properties. The player may view cashless instrument transaction information on the video display screen 234 or the florescent screen 216. For instance, when a player cashes out from the gaming machine, the value stored on the cashless instrument may be displayed using the video display 234. As another example, when a promotion ticket 220 is printed out from the printer 218 that is valid at a number of other gaming properties, a map may be displayed on the video display screen indicating where the other gaming properties are located.

Cashless Instrument Systems

Figure 2A:
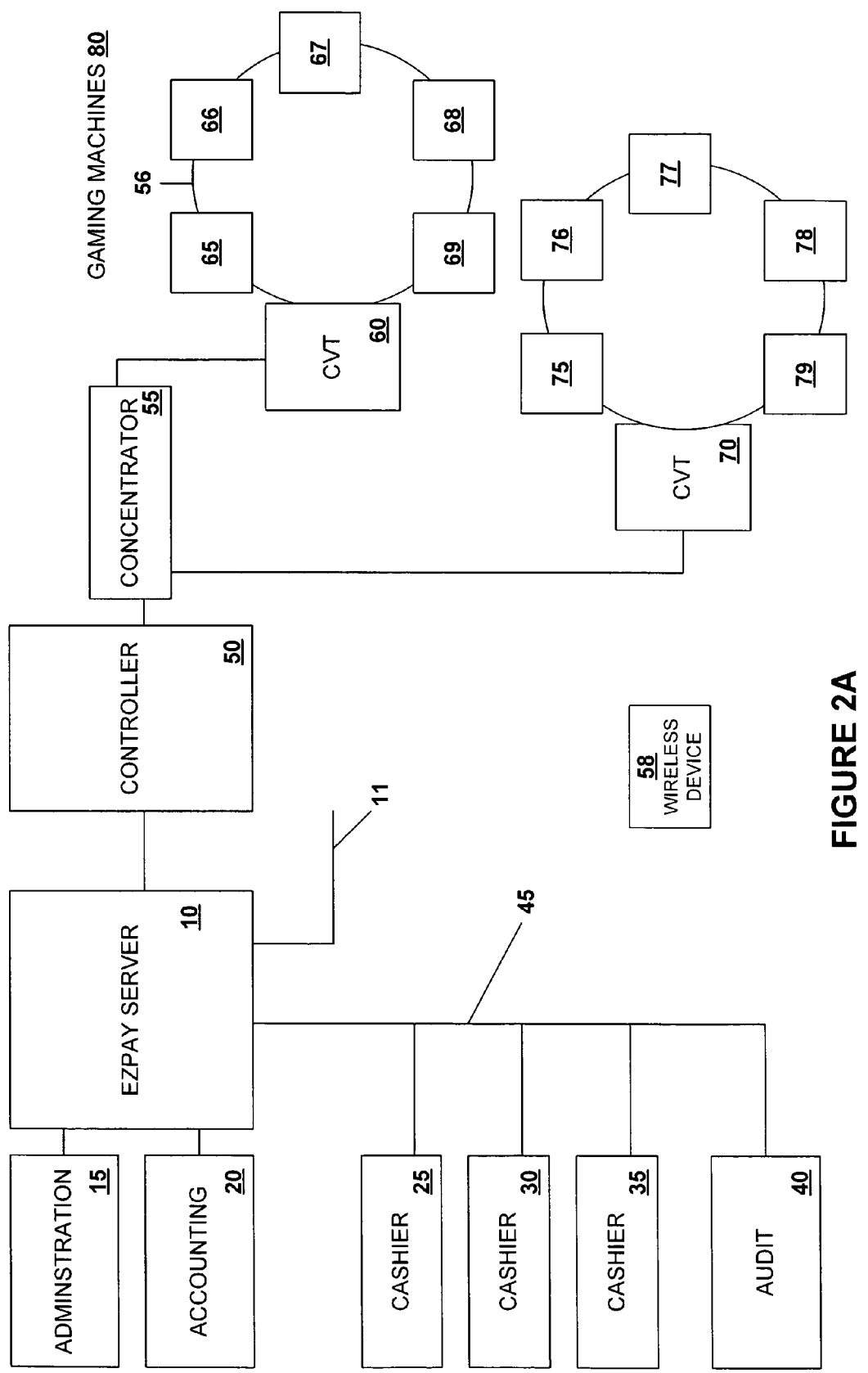
FIG. 2A is a block diagram of the components of an exemplary cashless system using the EZ Pay® ticket voucher system according to one embodiment of the present invention.

FIG. 2A is a block diagram of the components of a cashless system using the EZ Pay® ticket voucher system for one embodiment of the present invention. A cashless system can include the hardware components and software components needed to generate and validate cashless instruments. Components of a cashless system may include: 1) data acquisition hardware, 2) data storage hardware, 3) cashless instrument generation and validation hardware (e.g., printers, card readers, ticket acceptors, validation terminals and the like), 3) auditing software, 4) cashless instrument validation software and 5) database software, among other items. Many types of cashless systems are possible, and are not limited to the components listed above or specific embodiments such as the EZ Pay® ticket voucher system. Typically, a cashless system is installed at each property utilizing cashless instruments. To allow multi-site validations of cashless instruments, the cashless systems at each property can be linked to a cashless instrument transaction clearinghouse. The relation of multiple cashless systems connected to a cashless instrument transaction clearinghouse are described with reference to FIG. 3. The details of a cashless system at one property are described below with reference to FIGS. 2A and 2B.

Returning to FIG. 2A, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. These gaming machines and their associated cashless hardware are referred to as the block of gaming machines 80 in the figure. Some or all of the gaming machines can print ticket vouchers, which may be exchanged for cash or accepted as credit in other gaming machines, at gaming tables, or at various other locations within the property issuing the ticket. In this example, the ticket voucher serves as a cashless instrument. In addition, the gaming machines may accept ticket vouchers issued at a different gaming property, where such a different gaming property utilizes the same or a different cashless system as compared to the gaming property where the gaming machines are located.

When the CVTs are not connected to one another, a ticket voucher printed from one gaming machine might be only be used as indicia of credit in another gaming machine that is in a group of gaming machines connected to the same CVT. For example, where CVTs 60 and 70 may not be connected, a ticket voucher printed from gaming machine 65 might be used as credit of indicia in gaming machines 66, 67, 68 and 69, which are each connected to CVT 60, but not in gaming machines 75, 76, 77, 78, and 79, which are each connected to CVT 70. In an analogous manner, when the cashless systems from one property are not connected together with the cashless systems from other gaming properties, then a ticket voucher generated from gaming machine 66 might not be usable at gaming property different from the gaming property where gaming machine 66 is located.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also be stored within each gaming machine, or one gaming machine may functionally act as a CVT for a group of gaming machines, thus eliminating separate CVT hardware. In addition, cashless instrument transaction information may be stored in a cashless server, including the EZ Pay® server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information that is part of the cashless system using the slot data system (SDS) protocol set forth by Bally's Gaming Systems (Alliance Gaming Corporation) of Las Vegas, Nev., or the slot acquisition system (SAS) protocol set forth by IGT.

In this embodiment, when a player wishes to cash out a cash voucher or other ticket, the player may redeem vouchers printed from a particular gaming machine at the CVT associated with the gaming machine, or any other CVT which is part of the cashless system associated with the CVT. For example, since CVT 60 and CVT 70 are connected as part of a single cashless system to the EZ Pay® server 10, a player may redeem vouchers or utilize vouchers at the gaming machines, the CVTs (60 or 70), the cashiers (25, 30, 35, and 40) or the wireless cashiers 58. The CVTs, cashiers, wireless cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times. It will be appreciated that not all cashless systems may utilize CVTs, as many CVT functions can be transferred to a cashless server, such as EZ Pay® server 10, thus eliminating the functions within the CVT. For instance, cashless instrument transaction information may be stored in the cashless server instead of the CVT. Thus, the need to store cashless instrument transaction information within the CVT may be eliminated.

In this embodiment using the EZ Pay® system, multiple groups of gaming machines connected to CVTs are connected together in a cross validation network 45. The cross validation network 45 is typically comprised of one or more concentrators 55 that accept inputs from two or more CVTs and enable communications to and from the two or more CVTs using one communication line. The concentrator 55 is connected to a front end controller 50 that may poll the CVTs for ticket voucher information. The front end controller is connected to an EZ Pay® server 10, which may provide a variety of information services for the award ticket system including accounting 20 and administration 15. One hardware and software platform allowing cashless instruments to be utilized at all of the cashless validation sites (e.g., cashier stations, gaming machines, wireless cashiers and CVTs) within a single property and across multiple properties can be referred to as a "cashless server." In this embodiment, the EZ Pay® server 10 may function as the cashless server. Usually, the cashless server is a communication nexus in the cross validation network. For instance, the EZ Pay® server 10 is connected to the cashiers, wireless devices, remote cashless instrument transaction clearinghouse, CVTs and the gaming machines via the CVTs.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device 58 for validating ticket vouchers. Further details of such a wireless gaming device 58, including hardware and utilization, are described in commonly owned U.S. Pat. No. 6,682,421, entitled "Wireless Gaming Environment," which is incorporated herein by reference in its entirety. Information obtained from the ticket voucher is used to validate the ticket by comparing information on the ticket with information stored on one of the CVTs connected to the cross validation network. In addition, when the ticket voucher is issued at another property, information on the ticket may be stored at the other property. Thus, to validate the ticket voucher, the EZ Pay® server may have to communicate with the cashless instrument transaction clearinghouse via the remote connection 11 to obtain the information necessary to validate the ticket voucher.

As tickets are validated, this information may be sent to audit services computer 40 providing audit services, accounting computer 20 providing accounting services and/or administration computer 15 providing administration services. In another embodiment, all of these services may be provided by the cashless server, such as EZ Pay® server 10. Examples of auditing services, which may be provided by cashless system software residing on the auditing computer 40, can include: 1) session reconciliation reports, 2) soft count reports, 3) soft count verification reports, 4) soft count exception reports, 5) machine ticket status reports and 5) security access reports. Examples of accounting services, which may be provided by cashless system software residing on the accounting computer 20, can include: 1) ticket issuance reports, 2) ticket liability reports, expired ticket reports, 3) expired ticket paid reports and 4) ticket redemption reports. Examples of administration services, which may be provided by cashless system software residing on the administration computer 15, can include: 1) manual ticket receipt, 2) manual ticket report, 3) ticket validation report, 4) interim validation report, 5) validation window closer report, 6) voided ticket receipt and 7) voided ticket report.

Figure 2B:
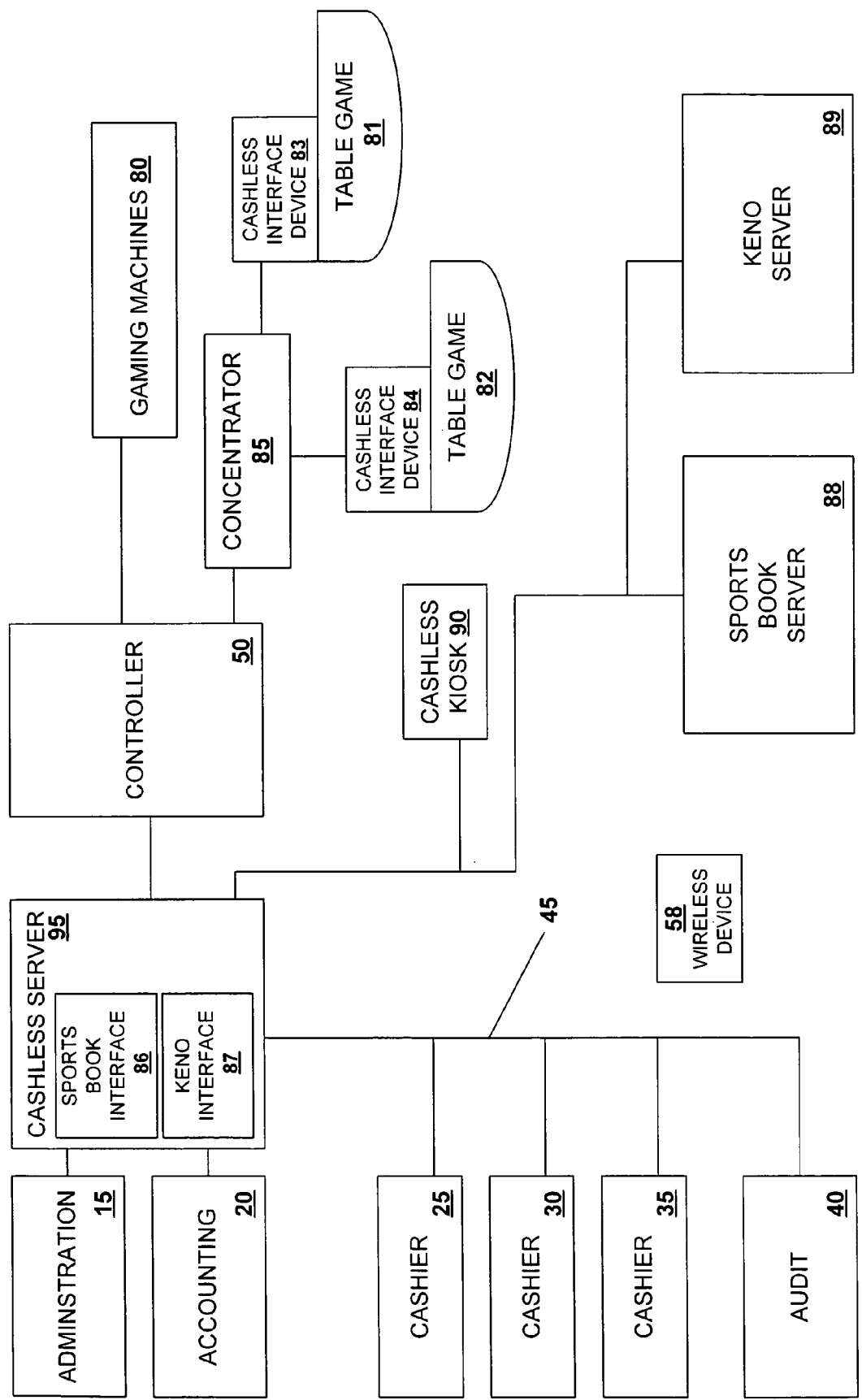
FIG. 2B is a block diagram of the components of cashless system for one embodiment of the present invention.

FIG. 2B is a block diagram of the components of cashless system for one embodiment of the present invention. The cashless system includes a cashless server 95, such as the EZ Pay® server 10 described with respect to FIG. 2A. In this embodiment, the cashless server 95 is connected to gaming machines 80 (described with respect to FIG. 2A), table games (e.g., 81 and 82), a keno server 89, a sports book server 88, a bingo server (not shown) and a casino kiosk 90. The table games may be of any type of table games found in a casino, such as, but not limited to, poker, blackjack, craps, roulette, baccarat, pai-gow poker, pai-gow tiles, and other card and dice games. Many different cashless system architectures are possible with the present invention and the system is not limited to the example in FIG. 2B. For instance, cashless server 95 may be connected to just the keno server 89 and the gaming machines 80 and not the sports book server 88 and the table games. As another example, the cashless server 95 may be connected to additional gaming devices and servers not shown in the figure. The keno server 89 may provide keno games and keno tickets as part of keno system. The keno server 89 may be connected to a plurality of gaming devices used to issue and redeem keno tickets. The bingo server may provide bingo games as part of a bingo system and may be connected to a plurality of gaming devices that provide bingo games. The sports book may be used to provide sports wagering as part of a sports wagering system. The sports book may be connected to a plurality of gaming devices used to issue and redeem sports wager tickets. In the past, the keno system, the bingo system and the sports wagering system have been operated as independent systems. Further, these systems typically only take cash only and casino chips may not be used to make sports wagers or for keno game play.

Traditionally, the keno system, the sports wagering system, the bingo system and the table games have not been operated with a cashless system as has been described in regards to the gaming machines 80 in FIG. 2A. In one embodiment of the present invention, all of these systems are connected to a cashless system, such as via the cashless server 95. Thus, cashless instruments with a cash value or a promotional credits (non-restricted or restricted) may be generated and validated for game play at the gaming machines, table games (i.e., table games and associated hardware), the keno system (keno server and associated hardware), the sports wagering system (sports book server and associated hardware) and the bingo system (bingo server and associated hardware), and used interchangeably between these venues.

As an example of interchangeability between the venues, a player may cash out at one of the gaming machines 80 and receive a cashless instrument with a cash value. The player may then present that cashless instrument with the cash value at one of the table games 81 or 82. Using one of the cashless interface devices 83 or 84, the cashless instrument may be validated at the cashless server 95. For instance, the cashless server 95 may contact the specific CVT connected to the specific gaming machine (as described in FIG. 2A) where the cashless instrument was generated to validate the cashless instrument. Alternatively, appropriate information regarding the cashless instrument can be stored at the cashless server 95 when the ticket voucher or other cashless instrument is first issued, such that further communication between a CVT and cashless server 95 is not necessary during a later validation process.

After validation of the cashless instrument, the cash value on the cashless instrument or a portion of the cash value may be applied to game play. For example, at a black jack game, a roulette game, a craps game, or any other similarly suitable type of table game, the portion of the cash value used for game play may be exchanged for casino gaming chips or another type of indicia of credit used to play the game. After a player has completed his or her gaming session at the table game, the player may then "cash out," whereby a second cashless instrument with a cash value, such as printed ticket voucher, may be generated by one of the cashless interface devices 83, 84. Further, when the player cashes out, an additional cashless instrument, with restricted or non-restricted promotional credits that may be used for game play, may be generated by one of the cashless interface devices 83, 84. Further details with respect to the conversion of tickets to chips, chips to tickets and various promotional items using cash vouchers and other paper tickets are set forth in greater detail below.

One advantage of this approach is that the player may find that carrying a single cashless instrument is more desirable then carrying a handful, rack or racks of casino gaming chips. Further, as will be described below, the cashless instrument may have more utility in that it can be used in more locations and for more activities than the casino gaming chips, which added utility might be even more desirable to the player. In addition, a handful of casino chips may be more easily lost and harder to keep track of then a cashless instrument, which may make cashless instruments more desirable to the player. With a cashless system as described, it is easier track where player resources are being utilized, and accounting procedures may be simplified, which is a benefit to gaming operators such as casinos. In one embodiment, the casino chips may be primarily used for game play at the gaming tables, and players will be encouraged to leave their chips at the tables and leave only with a cashless instruments. To encourage this type of behavior, random promotions at cash out of the chips for a cashless instrument may be offered, such as promotional credits.

This approach may be desirable for casinos because it may reduce the overhead associated with: 1) auditing procedures that they are required to implement by law in regards to the use of casino chips, 2) restocking tables with casino chips, 3) cashing out casino chips and 4) the acceptance of competitors casino chips, among other endeavors. These processes require a lot of manual labor and provide many theft opportunities. With a cashless system, many of the processes can be automated and many theft opportunities eliminated, which is desirable to casinos. For example, when a cashless instrument generated at a first casino is presented at a second casino for the play of a table game at the second casino, a cashless transaction clearinghouse may be used (see description below) to validate the cashless instrument and automatically send an electronic fund transfer to the first casino. In contrast, to use a casino chip from a first casino at the second casino, many manual processing tasks are required. For instance, the chip is stored in a container at the table game and later taken to a back room. In the back room, the chip is identified and then a request for a reimbursement is manually generated and then sent from the first casino to the second casino.

The cashless interface devices 83 and 84 at gaming tables may also comprise components used to generate and to redeem cashless instruments for use at other locations, such as at other gaming tables and/or gaming machines. For example, the gaming table cashless interface devices 83, 84 may comprise one or more of the following gaming devices: a bill validator that may be used to read tickets, a barcode scanner, a card reader for reading magnetic striped cards or smart cards, a key pad, a touch screen interface, a printer, a storage tray for blank tickets, a logic device (e.g., a microprocessor or microcontroller), a power supply, an RFID tag reader, a storage tray for validated tickets and/or a wired or wireless communication interface for communicating with devices such as a concentrator 85, communicating directly with the cashless server 95 or communicating with a player tracking/accounting server. The one or more gaming devices in the cashless interface devices 83 and 84 may be mounted in a housing.

Returning to FIG. 2B, after the second cashless instrument is generated by one of the cashless interface devices at the table games, the player may take the cashless instrument to a keno station connected to the keno server 89 and use the cash value on the instrument or a portion of the cash value to play a keno game. For example, if the cash value on the second instrument is $100, after the cashless instrument is validated, a player may purchase $50 worth of keno tickets and receive $50 cash payout for the remaining value of the ticket. In one embodiment, a casino service person carrying a hand-held wireless device may validate the second cashless instrument with the hand-held device and exchange it for keno tickets and cash for any remaining cash value on the instrument. Details of using a hand-held wireless device for redeeming cashless instruments are described in previously incorporated U.S. Pat. No. 6,682,421. The hand-held wireless device may also communicate with the keno server 89 to indicate that keno tickets have been issued to the player.

In another embodiment, the player may purchase keno tickets at a keno station connected to the keno server 89. The player may present the second cashless instrument at the station. Information stored on the second cashless instrument may be read into the keno system and sent to the keno server 89. The keno server 89 tracks all of the money going into and out of the keno system. Therefore, when a cashless instrument is validated to play keno, information regarding the portion of the cash value used for keno may be processed and stored by the keno server 89. The keno server 89 may also receive validation information stored on the cashless instrument. The keno server 89 may send the cashless server 95 a validation request message requesting the validation of the second cashless instrument. The validation request message may include validation information from the second cashless instrument needed by the cashless server 95 to validate the second cashless instrument. Further, the validation request message may include any additional information required for the keno server 89 and the cashless server to communicate in a secure manner 95. Details of secure communication are described in more detail in commonly owned U.S. Pat. No. 6,866,586, entitled "Cashless Transaction Clearinghouse," which is incorporated herein in its entirety and for all purposes.

In response to the validation request message, the cashless server 95 attempts to validate the second cashless instrument and may generate a reply message indicating an approval or rejection of the validation of the second cashless instrument. When the validation of the second cashless instrument has been approved, the keno server 95 may send a message to the keno station indicating the validation of the second cashless instrument has been approved. After the second cashless instrument has been exchanged for keno game play and for cash (if there is any remaining cash value not used for keno game play), the keno station may send a message to the keno server indicating the cashless transaction has been completed. The keno server 89 may store a record of the transaction and send a message to the cashless server 95 indicating the transaction has been completed.

After keno game play, the player may have a number of winning tickets from the keno game. In one embodiment, these tickets may be taken to a keno station and cashed out. The keno server 89 may be contacted to determine the winning keno tickets and validate the winning keno tickets. When the tickets are cashed out, a third cashless instrument may be generated with a cash value won from the keno game play. The keno server 89 may generate a message and send it to the cashless server to indicate a new cashless instrument has been generated. The message may include validation information that is stored on the cashless server and the newly generated cashless instrument. The validation information is compared with information read from the newly generated cashless instrument when it is later presented for validation at a validation site.

In one embodiment, prior to generation of the cashless instrument, a generation request message may be sent the cashless server 95 by the keno server to request a generation of a new cashless instrument. When a request is received by the cashless server 95 to generate a new cashless instrument from the keno server 89, the cashless server 95 may generate a reply message including validation information that may be stored on the cashless instrument that is to be generated, such as a unique serial number. The unique serial number may be stored on the new cashless instrument and stored on the cashless server 95. When a validation request for the newly generated cashless instrument is later received by the cashless server 95, the validation information, such as the unique serial number generated and stored on the cashless server 95, may be used for validation purposes.

A third cashless instrument generated as a result of a win at keno play may be taken by the player and presented at a sports book station connected to the sports book server 88. A portion or all of the cash value stored on the third cashless instrument may be used to make a sports wager. The sports book server 88 may process the third cashless instrument like the keno server 89 (i.e., sending a validation request message to the cashless server, and so forth). If the sports wager is a win, a fourth cashless instrument may be generated and processed by the sports book server 88 like the keno server 89. The fourth cashless instrument, as well as the first, second and third cashless instruments previously described, may also be used to make sports wagers, play table games, play gaming machines, play bingo, play keno and any other games that are offered at a casino, and the present invention is not limited to the sequence of game play described in the example above.

The cashless server 95 may include a keno interface 87 for communicating with the keno server 89 and a sports book interface 86 for communicating with the sports book. Additional interfaces may be provided for any other independent gaming systems, such as bingo, that communicate with the cashless server 95. The keno server 89 and sports book server 88 may also include a cashless system interface (not shown) that allows them to communicate with their corresponding interfaces on the cashless server 95. The interfaces may be defined by application program interfaces (APIs). The APIs may describe information, information formats and commands that may be exchanged by the servers.

In some embodiments of the present invention, it may be advantageous to provide a casino kiosk 90 where cashless instruments may be validated and utilized. The casino kiosk may be an automated menu driven system like an automatic teller machine. For example, in one embodiment at a casino kiosk, a player may be able to validate a cashless instrument and obtain keno tickets or a make a wager. The casino kiosk may be connected to the keno server 89, the sports book server 88 and the cashless server 95 to facilitate these transactions.

In another embodiment, the player may wish to partially cash a cashless instrument or transfer a portion of the cashless instrument to a remote account (see FIG. 11). In this case, the cashless instrument may be validated, the player may specify a cash amount they wish to receive and may receive cash for the specified amount (or transfer it an account) and receive a new cashless instrument with the remaining amount not cashed. In yet another embodiment, a player may wish to add cash to a cashless instrument. In this case, the player may input a cashless instrument into the casino kiosk 90 and input additional funds, such as cash or a transfer from another account, then a new cashless instrument with the added funds may be generated and issued to the player. In a further embodiment, a player may wish to combine a plurality of cashless instrument into a single cashless instrument. In this embodiment, the player may present a plurality of cashless instrument to the kiosk 90. The value of the cashless instrument may be added together and a single cashless instrument with the combined values may be generated and presented to the player.

In a particular embodiment, at the casino kiosk 90, a player may be provided transaction opportunities that allow a non-restricted cashless instrument to be converted to a restricted cashless instrument. A non-restricted cashless instrument is non-restricted in that the cash value stored on the cashless instrument may be redeemed for cash or used for game play in an unrestricted manner. For a restricted cashless instrument, the use of a cash value stored on the cashless instrument is restricted in some manner. For example, for a restricted cashless instrument, the cash value may only be spent during certain time periods (e.g., period during the day, the week, holiday periods, etc.), at certain locations (e.g., a particular gaming property or groups of gaming property), on certain games (e.g., a particular game of chance implemented on a gaming machine), for certain activities (e.g., keno, a type of table game). Of course combinations of restrictions may be used and the restrictions are not limited to only these examples, which are provided for illustrative purposes only.

The gaming operator may provide incentives to entice players to convert a non-restricted cashless instrument to a restricted cashless instrument or to purchase a restricted cashless instrument. As an example, the casino may offer to add value to a non-restricted cashless instrument to convert it to a restricted cashless instrument. To illustrate, the casino may offer to add two dollars to the cash value of a non-restricted cashless instrument with a six dollar value if it is converted to a restricted cashless instrument that may be used for game play only (for the game play only restriction, the credits may no longer be redeemed for cash but may only be used to play games). Alternatively, a player may be able to purchase for only six dollars a cashless instrument with an eight dollar value that is restricted to game play. In another example, the casino may offer to increase the player tracking points accumulated using a cashless instrument when it is converted from a non-restricted cashless instrument to a restricted cashless instrument. In one embodiment, these types of incentives may be awarded as a "comp" in a loyalty program, such as a player tracking program. The embodiments described in regards to the casino kiosk 90 are not limited to the casino kiosk. For instance, opportunities to convert a non-restricted cashless instrument to a restricted cashless instrument may be provided at a gaming machine, at the cashless interface devices or other devices in the cashless system. The ability to use cashless instruments at a plurality of different locations within a gaming establishment at a casino, such as at the table games, gaming machines, sports book and keno parlor, using a common cashless system may be extended to a plurality of gaming properties. For instance, a cashless instrument issued at a gaming machine at first gaming establishment may be used to play keno at a second gaming establishment. Details of a cashless instrument transaction clearinghouse that allow these transactions between multiple properties is described as follows.

Figure 3:
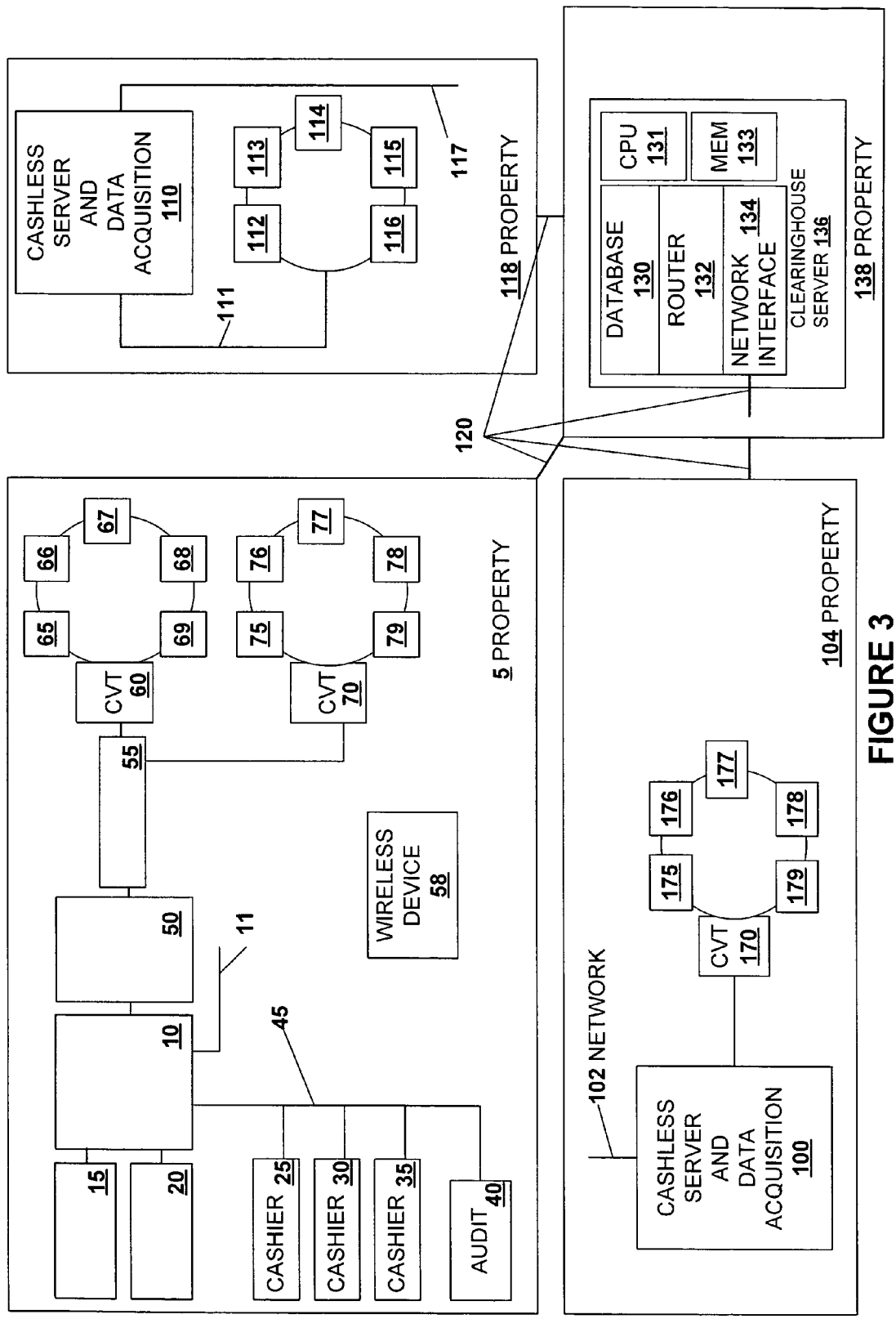
FIG. 3 is a block diagram of cashless systems at multiple properties connected to a cashless instrument transaction clearinghouse server.

FIG. 3 is a block diagram of cashless systems at multiple gaming properties connected to a cashless instrument transaction clearinghouse server. At property 5, property 104 and property 118, three different embodiments of cashless systems are shown. At property 104, gaming machines 175, 176, 177, 178, 179 send information to the clerk validation terminal 170. The CVT 170 sends information to the cashless server and data acquisition system 100. In this embodiment, the functions of the controller 50 and concentrator 55, as described with reference to FIG. 2, are combined into the cashless server and data acquisition 100. The cashless instrument used on property 104 may be smart cards, magnetic cards, ticket vouchers, combinations of the three or other cashless mediums.

The cashless server 100 contains a communication interface used to send information on cashless instruments generated on property 104 to the clearinghouse server 136 or request information on cashless instruments issued at other properties, including property 5 and property 118, that are being validated at property 104 from the clearinghouse server 136. The cashless instrument transaction information sent to the cashless server 100 from the clearinghouse server 136 and received by the clearing house server from the cashless server 100 is transmitted via the network connection 102. Details of information transmitted between the cashless servers including 10, 100, 110 and the clearinghouse server 136 in regards to multi-property cashless instrument validation are described with reference to FIGS. 4-7.

At property 118, gaming machines 112, 113, 114, 115 and 116 are connected to the cashless server and data acquisition system 110 via the local network 111. The local network 111 may be a wireless or wired connection system including fiber, copper or wireless cellular, combinations of all three or other connection systems. A separate CVT is not shown in this embodiment. The functions of the CVT including storage of ticket information may be built into one or more the gaming machines including 112, 113, 114, 115 and 116 or may be built into the cashless server 110. The information sent to the cashless server 100 from the clearinghouse server 136 and received by the clearing house server 136 from the cashless server 100 is transmitted via the network connection 102.

In one embodiment, the clearinghouse server resides on property 138 separate from the other properties, including property 5, property 118 and property 104, containing the cashless servers including 10, 100 and 110. In other embodiments, the clearinghouse server 136 may reside at the same property as one of the cashless servers. Communication between the clearinghouse server 136 and the two or more cashless servers, including cashless servers 10, 100, 110, may be performed via the network connections 120 and the network interface 134 residing within the clearinghouse server 134. The connections between the cashless servers and the clearinghouse server 136, including 11, 102, 117 and 120, may comprise a dedicated communication network.

Components of the cashless instrument transaction clearinghouse server 136 may include 1) a memory storage unit for storing cashless instrument transaction information in a transaction database 130, 2) a functional router 132 enabling communication between the clearinghouse server and different properties, 3) a CPU 131, 4) a memory 133 containing software for implementing the clearinghouse functions and 5) the network interface. The transaction database 130 may contain ongoing and past cashless instrument transactions processed using the clearinghouse server 136. The transaction database 130 may be implemented using Microsoft NT (Microsoft, Redmond, Wash.) and SQL (server query language). The cashless servers, including 10, 100 and 110, may also utilize this database technology. Cashless instrument transaction information for two or more gaming properties may be stored in the clearinghouse server transaction database 130. The properties may be owned by the same or different entities. The transaction database 130 may be accessed remotely by the properties, including 5, 104, and 118, utilizing the clearinghouse server 136. Further, the transaction database 130 may be used with analysis software to analyze transactions routed through the clearinghouse server 136.

The transaction database 130 may be partitioned according to properties or ownership of properties to limit access to the database 130. For example, when property 5, property 104 and property 118 are each owned by different entities, each property may only analyze cashless instrument transactions relating to cashless instruments generated and validated at their own property stored at the clearinghouse server 136. Thus, the owners of property 5 may access information relating to cashless instruments generated at property 5 and validated at properties 104 and 118 using the clearinghouse server 136, and the owners of property 5 may access information relating to cashless instruments generated at properties 104 and 118 validated at property 5. However, the owners of property 5 would not be able to access information in the database regarding cashless instruments generated at property 118 and validated at property 104. When more than one property is owned by a single entity, the single entity may be able to access cashless instrument transaction information relating to ownership of all of the properties owned by the single entity. For instance, when the single entity owns properties 5 and 104, the single entity may access the transaction database 130 for transactions relating to cashless instruments generated at properties 5 and 104 and validated at any of the properties using the clearinghouse server 136. Additionally, the single entity may access the transaction database 130 for transactions relating to cashless instruments generated at any of the properties and validated at properties 5 and 104. Transaction database 130 may also be partitioned according to players, types of games, and promotion types, as set forth in greater detail below.

The router 132 may contain routing information that allows the clearinghouse server 136 to determine where a cashless instrument was generated. The routing information is used when a cashless instrument is validated at a property different from the property where it was generated. For example, routing information is needed when a cashless instrument is generated at property 5 but the cashless instrument is validated at property 104. Each cashless instrument may be generated with a unique property identifier stored within the cashless instrument. When a validation request for the cashless instrument is received by the clearinghouse server, a property routing table stored within the router may be used by the server to determine where the cashless instrument was generated and communication information allowing the clearinghouse server 136 to communicate with the cashless server where the cashless instrument was generated.

The requirements associated with accounting and reporting of the cashless instrument information are dependent on the regulations within the jurisdiction. That being the case, the system is adaptable to those particular regulations. In general, a cashless instrument with an award amount may be considered to be analogous to a personal check written by the property where it was generated. When the cashless instrument is validated, it is essentially cashed. This implies that the property where the cashless instrument was generated must maintain a database of data related to those cashless instruments that were created on its property. This is analogous to maintaining a bank account whose sole purpose is to cover the cashless instruments that were generated at the property. This property is usually responsible for maintaining its cashless instrument database and validating cashless instruments. When a request to validate a cashless instrument is received by the cashless system at a particular gaming property, the property has the option of validating or rejecting the request. Once the property validates the cashless instrument, it is typically the responsibility of that property to insure its own cashless instrument transaction database is updated. At that time, the property that generated the cashless instrument now must transfer the funds to the property requesting the validation. The fund transfers may occur with each transaction or could be compiled in a batch to cover multiple ticket validation transactions on a periodic basis (e.g., once a night). The cashless instrument transaction clearinghouse facilitates all associated electronic fund transfers (EFTs) and acts as a third party between the parties. Details of these transactions are described with reference to FIGS. 4-7.

General Cashless Instrument Transaction Processes

Figure 4:
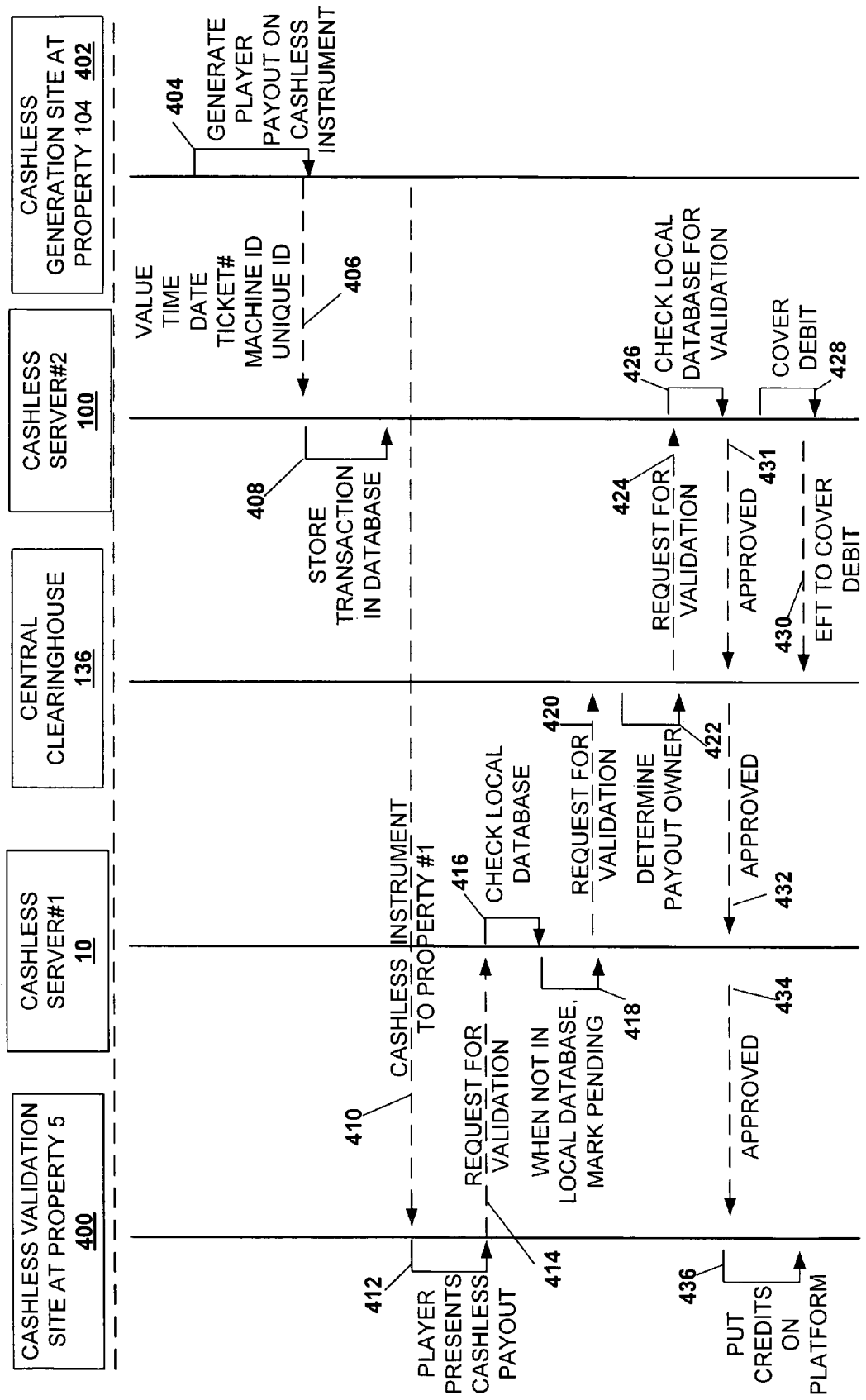
FIG. 4 is an interaction diagram for a cashless instrument transaction between a clearinghouse, cashless servers, and cashless generators/validators where the cashless instrument is generated at a different location from where it is validated.

FIG. 4 is an interaction diagram for a cashless instrument transaction between a clearinghouse, cashless servers, and cashless generators/validators where the cashless instrument is generated at a different location from where it is validated. In 404, a player payout (e.g., award) is generated on a cashless instrument at a cashless instrument generation site 402 at property 100. The cashless instrument generation site may include a gaming machine, a clerk validation terminal, a wireless validation terminal and a cashier station. The cashless instrument may include a printed ticket voucher (e.g., EZ Pay® ticket), a smart card, a debit card and other cashless mediums. In 406, when the cashless instrument is generated, cashless instrument transaction information, including: 1) a value, 2) an issue date, 3) an issue time, 4) a transaction number unique to the transaction, 5) a machine ID that generated the cashless instrument, 6) an issue location and 7) an owner, may be transmitted to the cashless server 100. The cashless instrument transaction information is also stored on the cashless instrument when the cashless instrument is generated in 404. In 408, the cashless server may store the cashless instrument transaction information in a database. The transaction information stored in the database is used when the cashless instrument is validated. The validation process may be invoked when the cashless instrument is redeemed for cash or when the cashless instrument is used in a gaming machine or other device that accepts the cashless instrument. The validation process involves comparing the cashless instrument transaction information stored on the cashless instrument with the cashless instrument transaction information stored in the cashless server database.

In 410, a game player takes the cashless instrument generated at property 100 to property 5. In 412, the game player presents the cashless instrument for a cashless payout at a cashless transaction validation site 400 at property 5. The cashless transaction validation site may include a gaming machine, a cashier station, a clerk validation terminal, a wireless validation device and any other devices that accept cashless instruments. For instance, when a debit card is used as a cashless instrument, the game player may be able to directly deposit the award on the debit card into a bank account accessible to the game player. In 414, a validation request is sent from the cashless transaction validation site 400 to the cashless server 10. The validation request may be an information packet containing the transaction information stored on the cashless instrument in 404 and stored in the cashless server database in 408.

In 416, the cashless server may check the local cashless instrument transaction database on the cashless server to determine if the cashless instrument was generated at property 5. The cashless server may check the local cashless instrument transaction database in a number of ways to determine whether a transaction record for the cashless instrument resides in the database. The database search technique may depend on what information is stored in the local database and what information is stored on the cashless instrument. When the cashless instrument was generated at a property using a different cashless system than the property where the cashless instrument is validated, the type and amount of cashless instrument transaction information stored on the cashless instrument may differ from the type and amount of cashless instrument transaction information stored on the local cashless instrument transaction instrument database. Thus, the search technique may depend on determining a common set of transaction information stored on the cashless instrument being validated and stored in the cashless instrument transaction database. For instance, when the cashless instrument contains a machine ID and the cashless instrument transaction database stores a list of all of the local machine IDs, the cashless server 10 may search the local cashless instrument transaction database to determine whether the cashless instrument was generated on one of the local machines at the property 5. As another example, when the cashless instrument contains transaction information on the property where the cashless instrument was generated or the owner of the cashless instrument (e.g., the owner of the property), the cashless server 10 may quickly determine whether the cashless instrument was generated at local property 5.

In 418, when the cashless instrument was not generated locally, the cashless server may mark the validation request pending in a local database and send a request for validation to the central clearinghouse in 420. The request for validation from the cashless server 10 to the cashless instrument transaction clearinghouse 136 may contain all or some subset of the information stored on the cashless instrument being validated. In addition, the request for validation may contain information about the cashless transaction validation site. For example, the identification information about the cashless transaction validation site 400, the property 5 where the cashless transaction validation site is being validated and the owner of the property may be included in the request for validation message. As in 414, the request for validation in 420 may be an information packet of some type sent using a pre-determined communication protocol between the cashless server 10 and the central clearinghouse 136. The communication protocol used to transmit transaction information between the cashless transaction validation site 400 and the cashless server 10 in 414 may be the same or different than the communication protocol used to transmit the transaction information between the cashless server 10 and the cashless instrument transaction clearinghouse 136 in 420.

In 422, the cashless instrument transaction clearinghouse determines the owner of the cashless instrument (e.g., the property where the cashless instrument was generated). The clearinghouse 136 determines the owner based upon information received in the validation request in 420 and based upon information stored in the clearinghouse 136. In 424, using routing information stored within the clearinghouse 136, a request for validation is sent from the clearinghouse 136 to the property where the cashless instrument was generated (i.e., property 104 in this embodiment). The request for validation is an information packet in a communication protocol of some type. The transaction information contained within the information packet is sufficient to allow the cashless server 100 at the cashless generation site 402 at property 104 to validate the cashless instrument. The communication protocol used to transmit the transaction information between the cashless server 10 and the clearinghouse 136 in 420 may be the same or different than the communication protocol used to transmit the transaction information between the cashless instrument transaction clearinghouse 136 and the cashless server 100 in 424. For example, the communication protocols may be different when the cashless system used at property 5 is different from the cashless system used at property 104.

In 426, the cashless server 100 checks the local cashless instrument transaction database to confirm the request for validation received in 424 is valid. When the transaction is valid (e.g., the cashless instrument was generated at property 104 and has not been previously validated), in 431, an approval message may be sent from the cashless server 100 to the clearinghouse 136. In 432, the clearinghouse may forward or generate the approval message to the cashless sever 10, and in 434, the cashless server 10 may forward or generate the approval message to the cashless transaction validation site 400. In 428, the cashless server may cover the debit by allocating or transferring funds to an account used to cover debits. In 430, the cashless server 100 may send an EFT to cover the debit to the clearinghouse 136. The EFT may be sent after each transfer or may be sent as a batch at the end of some time period (e.g., at the end of each day).

In 436, the validation site 400 at property 5 performs an appropriate operation when the validation is approved. For example, when the validation site 400 is a gaming machine, credits may be posted on the gaming machine. As another example, when the validation site 400 is a cashier station, the player may receive a cash amount according to the value of the cashless instrument. As yet another example, when the validation site 400 is a cashless interface device at a table game, a player may be provided with an appropriate amount of gaming chips in exchange for the value of the cashless instrument. As will be readily appreciated, although a cashless instrument has been described as a player payout or award for illustrative purposes, any form of cashless instrument may also be processed in the foregoing manner or any suitable alternative manner. Such other cashless instruments could be, for example, general promotions, player-specific promotions, game-specific promotions, and food or merchandise offers, among others.

One advantage of using a cashless system with EFT is that nothing physical has to be exchanged between the properties. When a token is issued as a credit of indicia at one property and then used at a second property, the second property may allow the token to be used as credit of indicia at the second property. However, the tokens must be counted at the second property and then shipped back to the first property and counted so that the second property may receive the amount of money associated with the token. For many properties accepting tokens from many different properties, the infrastructure associated with the counting, sorting and shipping of tokens from one property to another may be quite large. This type of infrastructure may be reduced or eliminated using the cashless instrument transaction clearinghouse with EFT between various properties connected to the clearinghouse.

Besides cashless instrument validations for payout, in another embodiment, the cashless validation processes described above using the cashless instrument transaction clearinghouse may be used to run promotions or complimentary promotions across multiple properties. For example, a promotion could be targeted for a specific player, type of gaming machine, table game or game theme, whereby the player would receive a cashless instrument such as a barcoded ticket from the gaming machine during game play. This barcoded ticket could be redeemed at any of the participating properties linked by the cashless instrument transaction clearinghouse. The barcoded ticket may be redeemed for merchandise or game play credit—whichever is defined as the promotion and printed on the ticket. Further, a ticket may be generated by a gaming machine or other issuing device to entice the player to redeem the ticket at a specific property, machine, table game or other location connected to the cashless instrument transaction clearinghouse. As described above, ticket validation is performed at the gaming property to verify that the ticket is a valid promotional or complimentary ticket. Rather then being limited to a single property, the cashless instrument transaction clearinghouse manages the promotions across the properties and maintains a centralized database containing the promotion theme parameters and the statistics once the game has begun.

In another embodiment, the cashless validation processes described above using the cashless instrument transaction clearinghouse may be used to run multiple progressive games associated with the generation or validation of cashless instruments at associated gaming machines or gaming tables, each of which is managed and controlled by cashless instrument transaction clearinghouse. These new types of progressive games are associated with either the redemption and validation of a cashless instrument or the generation of a cashless instrument upon cash out. At the time a cashless instrument is inserted into a gaming machine or other suitable cashless interface device for validation by the system, an event gets transmitted to the cashless instrument transaction clearinghouse, whereby the player validating the ticket or other cashless instrument has a chance to win a jackpot. A player may also win a jackpot when a cashless instrument is generated. These jackpot events may be incorporated as part of the cashless instrument generation and validation process as described above with reference to FIG. 4 and as described below with reference to FIGS. 5-7.

Similar to a lotto game where a sequence of numbers is used to match a central sequence of numbers in an attempt to win the lotto grand prize, the cashless instrument transaction clearinghouse randomly selects a sequence of numbers that is compared to the transaction validation number stored on the cashless instrument. When these two sequence of numbers match, the player wins the central jackpot and is notified of the win at the gaming machine or the cashless transaction validation site where the cashless instrument is being redeemed. Notification to the player may be made in a number of ways including: 1) on a gaming machine video screen, 2) by a screen, light or other output device associated with a cashless interface device at a table game, or 3) by generating a ticket or other cashless instrument at the gaming machine or other cashless transaction validation site indicating the player has won the jackpot.

The jackpot can be funded in many different ways including, but not limited to: 1) a small percentage of all tickets being held by the cashless instrument transaction clearinghouse (e.g., 5 cents of each ticket inserted or cashed out is paid to the cashless instrument transaction clearinghouse for a chance to win the progressive jackpot), and 2) each property connected to the cashless instrument transaction clearinghouse pays a small amount (cents) into the progressive jackpot each time the player cashes out or redeems a ticket. In addition, the player may have the option at the gaming machine to play for the progressive jackpot upon cashless instrument generation and cashless instrument validation. Thus, the player may choose to commit a small percentage of the cashless instrument towards winning the jackpot, which thus funds the jackpot.

In general, there may be more then one such progressive jackpot managed by the cashless instrument transaction clearinghouse. With multiple progressive jackpots managed by the clearinghouse, each property may have a small progressive for matching a few numbers in addition to a larger progressive across all properties when all numbers on the ticket are matched. The multiple progressive jackpots may provide more chances for a player to win a jackpot. In addition, progressive jackpots may encourage the use of cashless instruments by the game player, which as mentioned above, provides many operational advantages to the properties using cashless systems.

Figure 5:
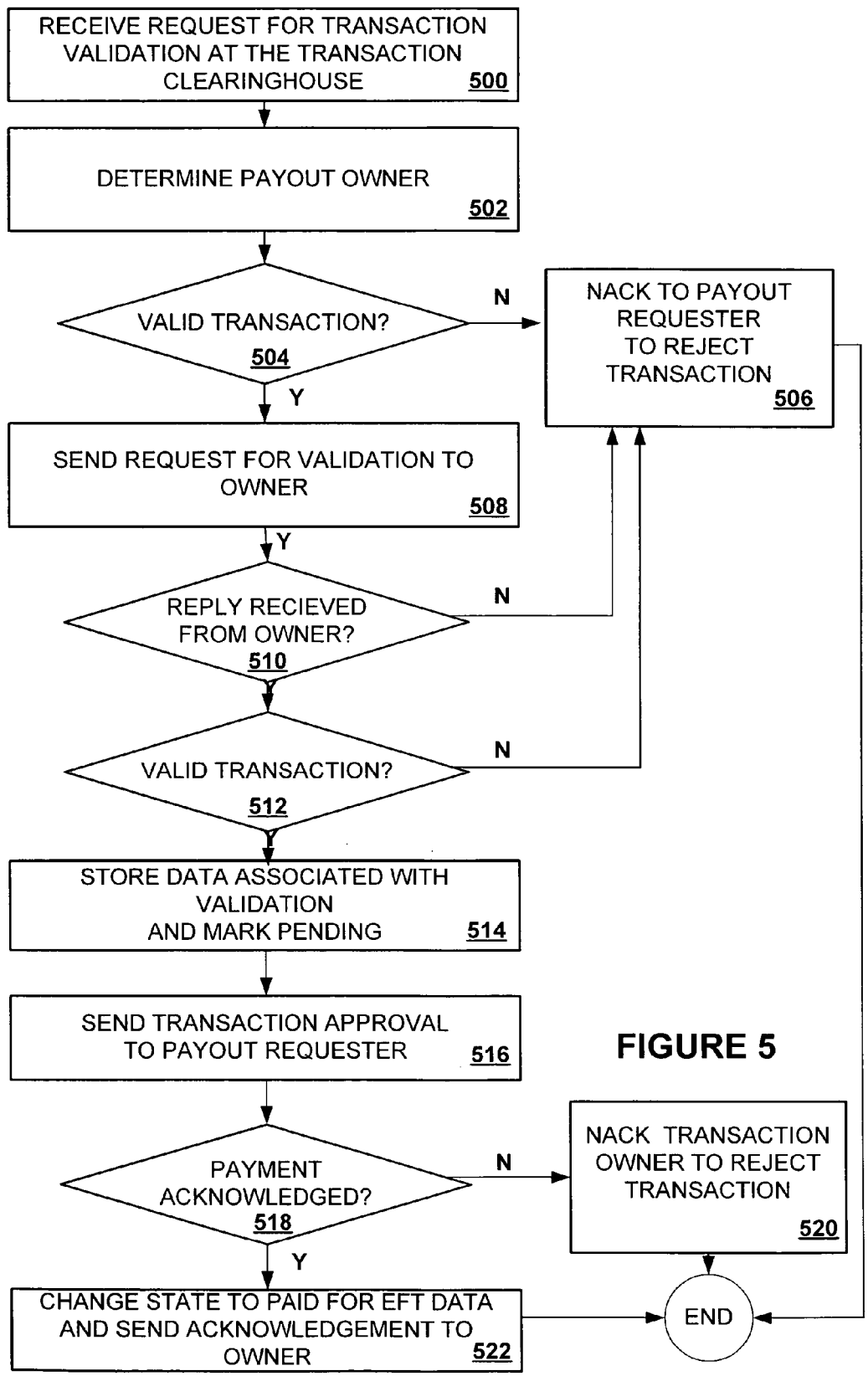
FIG. 5 is a flowchart depicting a method of validating a cashless instrument transaction at a cashless instrument transaction clearinghouse.

FIG. 5 is a flowchart depicting a method of validating a cashless instrument transaction at a cashless instrument transaction clearinghouse. One context of the method of validating the cashless instrument transaction at the cashless instrument transaction clearinghouse is described with respect to FIG. 4. In 500, a request for a cashless instrument transaction validation is received at the clearinghouse 500 from a cashless server. In 502, using information received in the transaction validation request, the clearinghouse determines the transaction owner described in the transaction validation request. In 504, the clearinghouse may determine the validity of the transaction. A transaction may be invalid for a number of reasons including: 1) the transaction owner is unknown, 2) the transaction is pending and 3) the transaction has previously been validated. In 506, when the transaction is not valid, a transaction validation reply containing a Non-Acknowledgement (NACK) is sent to the transaction requester of the transaction validation request. The NACK indicates to the transaction requester that the transaction can not be validated at the present time.

In 508, a validation request for the transaction is sent to the cashless server, which is the cashless instrument transaction owner determined in 502. In 510, when a validation reply to the validation request is not received by the clearinghouse from the cashless instrument transaction owner, a transaction validation reply with a NACK is sent to the transaction validation requester in 506. In 512, when a validation reply is received from the cashless instrument transaction owner, the clearinghouse determines whether the validation transaction has been approved or rejected by the cashless instrument transaction owner. A transaction may be rejected for a number of reasons including: 1) the cashless instrument has already been validated (e.g., paid), 2) a record of the cashless instrument cannot be found and 3) a cashless instrument with transaction information matching the validation request is currently pending. In step 506, when a transaction is rejected, a transaction validation reply with a NACK may be sent to the transaction validation requester.

In 514, when the transaction has been approved by the cashless instrument transaction owner, data associated with the transaction is stored in the clearinghouse database and the transaction is marked pending. While the transaction is pending, the clearinghouse may reject (i.e., 506) validation requests for cashless instruments with transaction information identical to the pending transaction validation request. This operation may be implemented to prevent fraud. In 516, a transaction validation reply with information indicating the requested transaction has been validated is sent from the clearinghouse to transaction validation requester, which may be a cashless server. In 518, when the payment of the transaction by the transaction validation requester is not acknowledged in a message of some type, a message containing a NACK may be sent to cashless instrument transaction owner in 520. In 522, when the payment by the transaction validation requester is acknowledged, the state of the transaction is changed from pending to paid and a message may be sent to the owner of the transaction indicating the transaction has been paid. Transaction information stored by the clearinghouse may be used to insure an EFT is made from cashless instrument transaction owner to the cashless instrument transaction validator.

Figure 6:
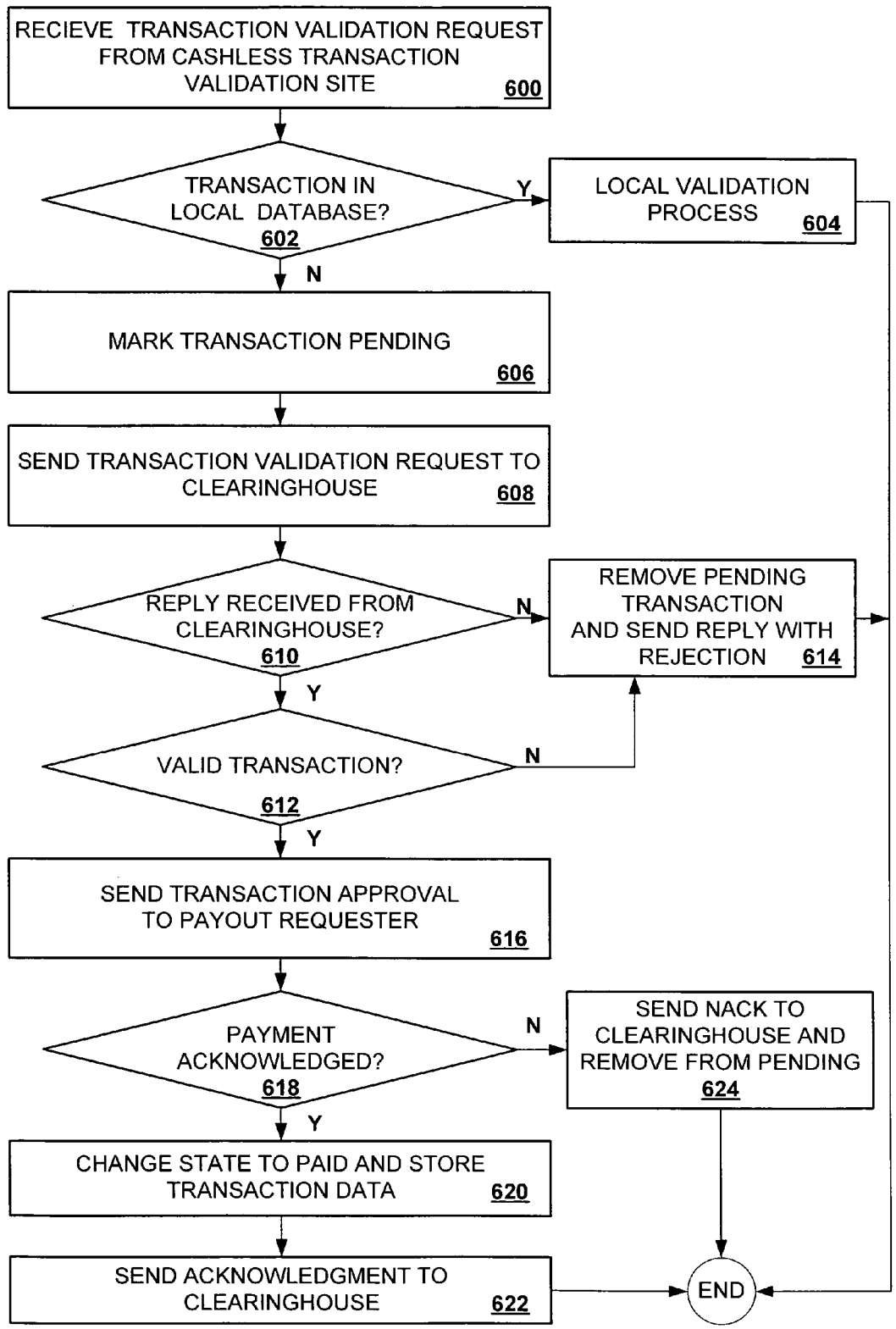
FIG. 6 is a flowchart depicting a method of validating a non-local cashless instrument at a cashless transaction validation site local to the cashless server.

FIG. 6 is a flowchart depicting a method of validating a non-locally owned cashless instrument at a cashless transaction validation site local to the cashless server. One context of the method of validating the non-local cashless instrument transaction at the cashless server is described with respect to FIG. 4. In 600, the cashless server receives a cashless instrument validation request from a cashless transaction validation site. In 602, the cashless server determines the owner of the cashless instrument. When the cashless instrument is locally owned, (e.g., the cashless instrument is being validated at the same property where the cashless instrument was generated) a local transaction validation process is used in step 604. One example of a local transaction validation process with respect to a cashless system was described with reference to the EZ Pay® system in FIG. 1.

In 606, when the cashless instrument transaction owner is non-local, the transaction is marked pending in the cashless server database. In 608, a transaction validation request message containing the cashless instrument transaction information needed to validate the cashless instrument validation request is generated and sent to the cashless instrument transaction clearinghouse. In 610, when a transaction validation reply is not received from the clearinghouse, in 614, the transaction validation request is removed from the queue of pending transaction validation requests, a message containing a transaction rejection is generated and the message rejecting the transaction is sent to the transaction validation site. When a transaction validation reply is received from the clearinghouse, the transaction validation reply typically will contain information regarding whether the requested transaction has been approved or rejected. In 612, when the transaction is rejected, in 614, the transaction validation request is removed from the queue of pending transaction validation requests, a message containing a transaction rejection is generated and the message rejecting the transaction is sent to the transaction validation site.

In 616, when the transaction validation reply approving the transaction validation request is received by the cashless server from the clearinghouse, a transaction approval message may be sent to the cashless transaction validation site that requested the transaction validation in 600. When the execution of the transaction is not acknowledged by the cashless transaction validation site, in 624, the cashless server sends a message to the clearinghouse indicating the transaction has been cancelled and removes the transaction from its queue of pending transactions. In 618, the payment may not be acknowledged for a number of reasons including: 1) a communication failure between the cashless transaction validation site and the cashless server, 2) an equipment failure and 3) an operator of the cashless transaction validation site rejects the transaction for some reason. In 620, when the cashless server has received an acknowledgement message from the cashless transaction validation site indicating the cashless instrument transaction has been completed, the state of the transaction is changed from pending to completed (e.g., paid) and information regarding the cashless instrument transaction is stored. In 622, an acknowledgement message indicating the transaction has been completed may be sent to the clearinghouse.

Figure 7:
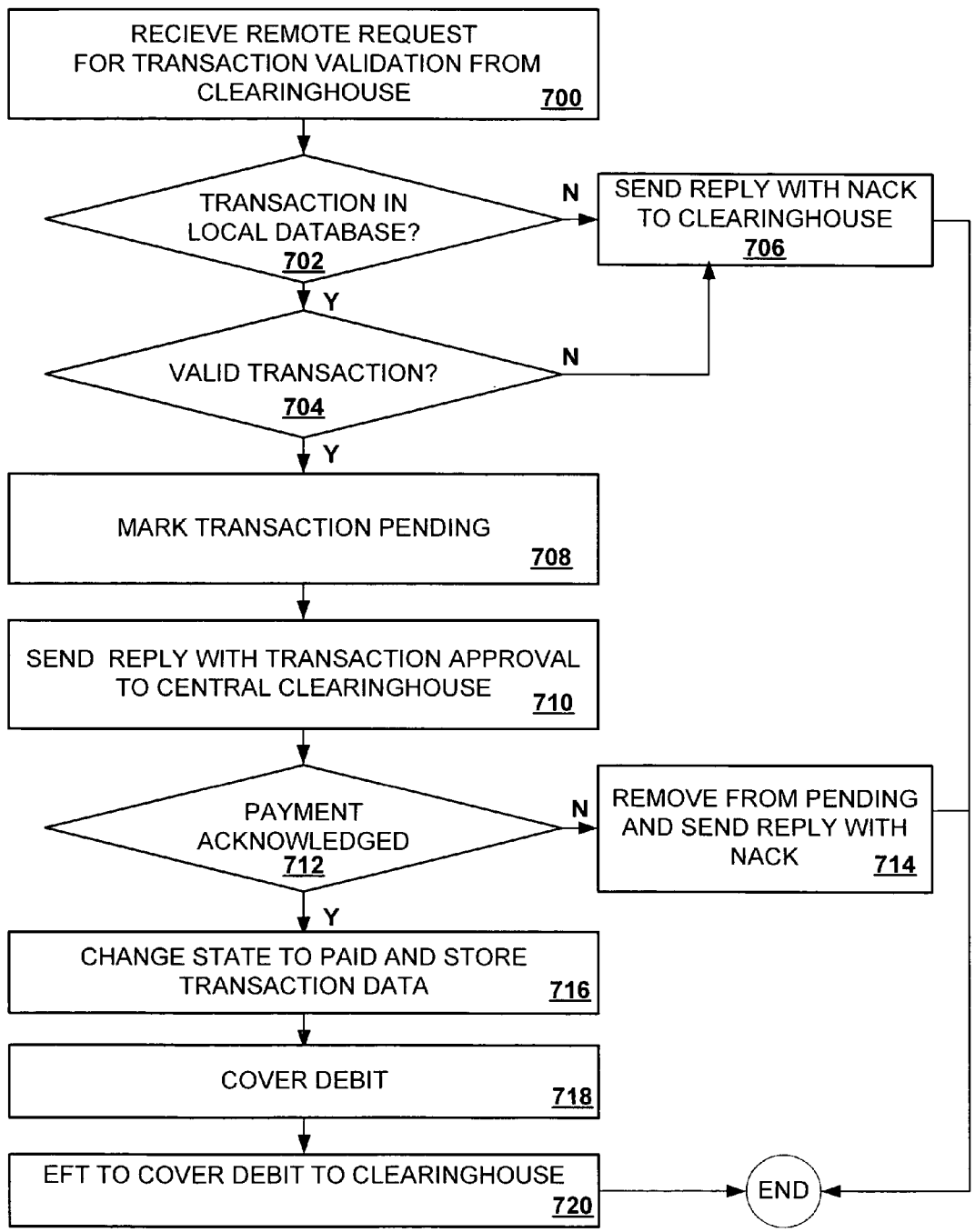
FIG. 7 is a flowchart depicting a method of validating a cashless instrument at a cashless transaction validation site non-local to the cashless server containing a record of the cashless instrument.

FIG. 7 is a flowchart depicting a method of validating a cashless instrument at a cashless transaction validation site non-local to the cashless server containing a record of the cashless instrument. One context of the method of validating a cashless instrument at a cashless transaction validation site non-local to the cashless server containing a record of the cashless instrument is described with respect to FIG. 4. In 700, the cashless server containing the record of the cashless instrument receives a transaction validation request from the cashless instrument transaction clearinghouse. The transaction validation request from the cashless instrument transaction clearinghouse is an information packet that may contain the information needed for the cashless server to validate the transaction.

In 702, using the information contained in the information packet, the cashless server determines whether the transaction has been stored in a database accessible to the cashless server. In 706, when the transaction does not reside in the local database, a non-acknowledgement message indicating the transaction has been rejected is sent to the clearinghouse. In 704, when the transaction resides in the database accessible to the cashless server, the cashless server rejects or approves the transaction. The cashless server may reject a transaction for a number of reasons including: 1) the transaction has already been paid and 2) the transaction has been marked pending. When the transaction is rejected, a non-acknowledgement message indicating the transaction has been rejected is sent to the clearinghouse.

In 708, when the transaction has been approved, the cashless server marks the transaction pending in the local database. In 710, the cashless server generates and sends a message to the central clearinghouse where information contained in the message indicates the transaction has been approved. In 712, the cashless server determines whether the payment has been acknowledged. The cashless server may receive an acknowledgement of payment via an acknowledgement message sent by the cashless instrument transaction clearinghouse. Typically, the cashless server may expect an acknowledgement during a fixed period of time. In 714, when the payment of the transaction is not acknowledged by the clearinghouse, the cashless server may remove the pending status of the transaction and send a message to the clearinghouse indicating the transaction is no longer approved. In 716, when the transaction is approved, the cashless server changes the state of the transaction to paid and stores the transaction data. In 718, as described with reference to FIG. 4, the cashless server covers the debit. In 720, the cashless server may send an EFT to cover the debit, as represented by a paid transaction, to the cashless instrument transaction clearinghouse.

Further details regarding the facilitation of various types of transactions involving cashless instruments, and for providing and operating a cashless instrument transaction clearinghouse and various associated items in general, are provided in the parent case, U.S. patent application Ser. No. 10/406,911, which is again incorporated by reference herein in its entirety and for all purposes. Such additional details and items include embodiments regarding a graphical user interface (GUI), cashless transaction threads and thread generation, promotion related cashless threads, resource regulation and transfer, player identification, biometrics, anonymous gaming, alternative validation approaches, security, alternative multi-site transaction relationships and processing capabilities, and usage involving smart cards, promotional storage cards and other alternative cashless instruments. Although the focus here now shifts to specific embodiments involving transactions and promotions with respect to gaming tables and other suitable gaming venues, it will be readily appreciated that some or all of these incorporated embodiments and items may be similarly used with respect to such gaming table based cashless instrument transactions and associated promotions.

Gaming Table Based Cashless Instrument Transactions

As noted previously, various forms of cashless instruments, such as the cash vouchers or printed tickets used by the EZ Pay® ticket system, can be adapted for use in conjunctions with gaming tables, such as blackjack, poker, craps, roulette, baccarat, pai-gow poker, pai-gow tiles, Carribean Stud, Spanish 21, Let It Ride, and any other form of table game suitable for play in a casino or other gaming establishment. Such use can be facilitated by one or more cashless interface devices, such as the cashless interface devices 83, 84 shown in association with table games 81, 82 in FIG. 2 above. It will be readily appreciated that a wide variety of devices and programs can be used to perform the functions associated with such cashless interface devices at gaming tables, with such devices potentially including, but not limited to, ticket readers, ticket printers, card readers, cameras, RFID reading and writing devices, processors, modems, wired and wireless communications interfaces, buttons, keyboards, mice, touch screens, display screens, speakers, and various software programs to support one or more of the foregoing devices and items, among others.

Of the various functions to be performed by a cashless interface device at a gaming table, particularly noteworthy functions include both the ability to accept cashless instruments as a form of buy-in or credit at the gaming table, as well as the ability to print or otherwise issue new cashless instruments directly at the gaming table. Of course, it may be possible to have cashless interface devices that perform only one such function, rather than both. In the event that additions are made to an existing cashless instrument system, such as an existing EZ Pay® ticket system installed only for gaming machines, for example, any added functionalities with respect to gaming tables may require one or more additional modules in order to support ticket related transactions for table games, as will be readily appreciated.

In various embodiments, players may be permitted to buy in or otherwise receive credit at a gaming table by presenting at the gaming table a suitable cashless instrument, such as an EZ Pay® ticket or any other printed ticket, for example. The table dealer, pit supervisor or other appropriate casino personnel can accept the ticket or other cashless instrument from the player and then validate it at an appropriate cashless interface device, preferably at the gaming table where the ticket or other cashless instrument is offered. Various processes with respect to cashless instrument validation are provided in greater detail above. Upon validating the ticket or other cashless instrument, the player can then be presented with an appropriate amount of gaming chips at the table, such as for the play of table games at the gaming table. In essence, such a transaction can be substantially similar to the cash out or redemption of a printed ticket or other cashless instrument, only the venue is a gaming table rather than a cashier cage, and the redemption is in the form of gaming chips rather than cash, currency or credit to a player account.

As one illustrative example of the convenience behind such a more versatile ticket voucher or cashless instrument system, a given player having a gaming session at a set of gaming machines may decide that he would rather play blackjack at a gaming table instead. Rather than cashing out his remaining balance at the gaming machine for coins, the player simply elects to have a printed ticket containing his remaining balance at the gaming machine issue from the gaming machine. Rather than taking this printed ticket, such as an EZ Pay® ticket, to the cashier cage for cash, the player simply goes directly to a blackjack table and presents the printed ticket there. The dealer or pit boss accepts the ticket and validates it at the gaming table or nearby in the pit, and then presents the player with his gaming chips to play blackjack. For example, if the printed ticket was in an amount of $105, the player might be presented with 21 gaming chips of a $5 denomination for play at the blackjack table. If the printed ticket was for $107, however, then the same 21 $5 chips, plus an additional 2 chips of a $1 denomination could be provided to the player.

Printed tickets for fractional dollar amounts and other amounts difficult to cash in for gaming chips could result in an additional printed ticket being issued for any remainder amount. Alternatively, such a remainder amount could be dealt with using a roundup promotion, as detailed below. Such a remainder amount might also be requested by a player at the time of cashing in for gaming chips. For example, a player offering a printed ticket for $105 might prefer to have only $50 of the ticket cashed in for gaming chips at the gaming table, with the remainder being provided to the player in cash, credit or an additional printed ticket. In such an instance, such a requesting player might be provided with 10 $5 gaming chips and a second printed ticket in the amount of $55. Of course, whether a player is presented with all gaming chips or some portion of gaming chips and some portion of cash, credit or an additional printed ticket, it is preferable that the original offered printed ticket be taken from the player at the gaming table and kept by the casino or other gaming establishment. In the event that the cashless instrument offered is of the type to be retained by the player, such as a smart card, magnetic striped card or other account based token, an appropriate adjustment to the instrument or an associated player account balance can be made at the time that a buy in of gaming chips is made.

In addition to allowing players to convert printed tickets and/or other suitable cashless instruments to gaming chips, it is also contemplated that the same devices and systems can be used to allow players to covert gaming chips to printed tickets and/or other suitable cashless instruments. In this manner, players are able to bring cash and/or cashless instruments to gaming tables to buy in for gaming chips, and can then be presented with cashless instruments in place of gaming chips when their gaming sessions are over at their respective gaming tables and they are ready to leave, such as to cash out at a cashier cage. As noted above, such an ability can be useful to players in that carrying a single cashless instrument can be more desirable than carrying handfuls or racks of gaming chips, and also due to the more versatile nature of a cashless instrument, such as a printed ticket. Such capabilities for players to leave gaming tables with printed tickets or other cashless instruments rather than gaming chips can also be advantageous to casinos, in that the much of the overhead involved with auditing, restocking and tracking gaming chips can be reduced or eliminated.

With respect to the issuance of cashless instruments at a gaming table, various checks and security procedures can be implemented. Such checks and security procedures can be similar to those implemented for "coloring up" gaming chips (i.e., converting many low denomination gaming chips to one or a few high denomination gaming chips). For example, a dealer at the gaming table may be permitted to convert gaming chips to a printed ticket on his own for a player for amounts at or below a certain lower threshold, such as, for example, $100. At amounts above this lower threshold but still below a higher threshold, a verbal check or call to a floor supervisor may be required. For example, a verbal call out of "Cashing out $355" might be used where a player asks for a printed ticket in exchange for 71 $5 gaming chips. A floor supervisor, security, camera operator or other suitable casino personnel might then have the opportunity to observe or supervise such a mid-level conversion of gaming chips to a printed ticket or other suitable cashless instrument.

At a higher threshold, such as, for example, $500 or $1000, security procedures could be implemented to make it necessary for a floor supervisor or other casino personnel having greater authority than a dealer to convert gaming chips to a printed ticket and issue such to a player. For example, where a player wishes to convert 23 $100 gaming chips to a printed ticket at the gaming table, a supervisor could be called over to closely supervise or otherwise personally administer the $2300 high-level conversion. For such instances, a key, password, personal identification number (PIN) or other security device may be required by a subject cashless interface device before it will print a ticket or issue a conversion having a value greater than a set threshold amount. Of course, such a security device might also be required of a dealer even for low or mid-level conversions of gaming chips, such that players or other unscrupulous parties are hindered from issuing unwarranted tickets or credits from a cashless interface device. As will be readily appreciated, further thresholds and even more stringent security requirements may also be implement for still larger amounts of gaming chip or ticket values, as desired.

Another security measure that could be implemented with respect to one or more cashless interface devices at table games involves the use of radio frequency identification (RFID) chip tracking devices. Devices such as RFID transmitters and readers can be used in conjunction with RFID based gaming chips, such as those that may be implemented for use on gaming tables in particular. Where such gaming tables and/or an associated cashless instrument system are adapted for use with RFID embedded gaming chips, one or more RFID reading devices placed at or about the gaming table can be adapted to read various gaming chip transactions and movements. Details of creating and implementing RFID based gaming chips and RFID reading devices at gaming tables can be found at, for example, U.S. Pat. Nos. 5,651,548 and 5,735,742 by French and Piehl, which references are incorporated herein by reference in their entirety and for all purposes. Advanced implementations of such RFID gaming chip and table game tracking technologies might also be provided by, for example, Magellan Technology Pty Limited of Annadale, Australia, among other vendors.

It is specifically contemplated that the use of RFID technology can be tied to monitoring and/or tracking the conversion of cashless instruments to gaming chips and the conversion of gaming chips to cashless instruments. In such instances, gaming chips that have been implemented with RFID chips can be tracked at times of cashing in or cashing out at the gaming table in conjunction with printed tickets or other suitable cashless instruments. For example, a player approaching the table with a $105 EZ Pay® ticket might offer the ticket for gaming chips, and after the ticket is validated, $105 worth of RFID enabled gaming chips can be placed in a designated area on the table that can be read by an RFID chip reader at the table. The $105 EZ Pay® ticket can then be canceled and taken away at or about the same time that the $105 worth of read and verified RFID enabled gaming chips are pushed toward or otherwise provided to the player. Regardless of the specific implementation, RFID chip readers are preferably adapted to forward RFID gaming chip data to one or more locations, such as a cashless interface device at the gaming table, a central LAN based server and/or database, and/or a centralized WAN based server and/or database or data repository. Where an independent RFID gaming chip tracking system and associated components are to be interfaced to a cashless instrument system, various APIs may need to be implemented between the differing systems, as will be appreciated.

In some embodiments, an RFID chip tracking system can be adapted to work in conjunction with one or more bill acceptors, cashless interface devices and/or other suitable cash or credit tracking devices at the subject gaming tables or other tracked gaming activity locations. In such arrangements, cash, printed tickets or other suitable credit instruments can be input to a bill acceptor, ticket acceptor or reader, or other suitable device as part of a regular cash in and/or cash drop procedure at a gaming table or other suitable venue, whereupon a corresponding level of gaming chips are then provided to the player providing the cash or credit. An automated check can then be performed between the readings made of the bill acceptor or other suitable credit accepting drop device and the RFID reading devices to ensure that the proper level of gaming chips have been provided to the player. For example, where a player "buys in" at a tracked gaming table by providing a $100 printed ticket, twenty $5 RFID embedded gaming chips might be provided to the player, such as in a manual transaction by the dealer. A printed ticket reader and acceptor at the table can register and "drop" the $100 ticket, and then provide this information to the RFID chip tracking system. Contemporaneously or soon thereafter, one or more RFID reading devices at the table can detect that twenty $5 RFID embedded gaming chips have been provided to the player, at which time this information can be correlated with the $100 ticket drop information. In the event that 19 or 21 gaming chips have been inadvertently provided to the player, an alert can be provided and appropriate correction made.

Because it is an inherent part of virtually all gaming establishments that each gaming table must account for its gaming chips or markers, appropriate interface devices and/or procedures can be implemented with respect to accepted tickets within the usual softcount procedures of a gaming establishment. As is generally known, the drop boxes from gaming tables are typically used to temporarily store cash, coupons and other indices of credit as players arrive at the tables and cash in for gaming chips. These drop boxes are periodically removed and taken to a back room for soft count procedures to count the contents of the boxes and determine if they match with any expectations that have been generated on the casino floor. With the addition of printed tickets and/or other cashless instruments to the gaming table cash in processes, further provisions for counting and reconciling such tickets or instruments must be made. Such softcount sort and reconciliation procedures can be similar to those provided with respect to gaming machines adapted to accept printed tickets, examples of which are provided in, for example, commonly owned and co-pending U.S. patent application Ser. No. 09/631,855 by Rowe and entitled, "Method And Apparatus For Voucher Sorting And Reconciliation In Soft Count Process," which is incorporated herein in its entirety and for all purposes.

In addition to purely cash value tickets, such a softcount sort and reconciliation process can be further adapted to account for all promotional tickets and combination cash value and promotional tickets accepted at gaming tables. Further, while it may be preferable in some cases to physically accept, store, sort and count the actual printed tickets or vouchers, alternative softcount systems might also be used to work with embodiments where such physical tickets or other cashless instruments are actually destroyed or physically altered upon acceptance. For example, a printed ticket system might be adapted to take a picture, image or other secondary proof of a printed ticket upon acceptance, after which the ticket can be shredded or otherwise destroyed. The image or secondary proof can then be used for any future reconciliation or processing with respect to that accepted, canceled and destroyed ticket. Further details of such an image capturing and recording system can be found at, for example, for example, commonly owned and co-pending U.S. patent application Ser. No. 10/898,600 by Silva, et al. and entitled, "Electronic Image Acquisition for Gaming Systems," which is incorporated herein in its entirety and for all purposes.

In some embodiments, the provided cashless interface devices and other cashless instrument system components can also be interfaced to a player tracking system, such as a player loyalty or points program. Examples of such player loyalty or points programs can be found at, for example, commonly owned and co-pending U.S. patent application Ser. No. 10/214,936 by Kaminkow, et al. and entitled, "Flexible Loyalty Points Programs," which is incorporated herein in its entirety and for all purposes. Such player tracking or loyalty programs can be further adapted to track when, where and by whom various printed tickets and other cashless instruments are used. Such tickets and cashless instruments can be both cash value and promotional items. For example, while some EZ Pay® tickets might have a pure cash value, other tickets or cashless instruments might be purely promotional in nature, while still others might have some combination of cash value and promotional value. Some of the promotional value items might be directed toward specific players, specific groups of players, specific games and/or specific groups or types of games, such as table games, as set forth in greater detail below. When used in conjunction with a player tracking system, additional data on players can be gathered, such as types of games played, specific promotions used, and overall popularity of different promotions, among other items.

While such data might certainly be useful with respect to a player tracking system, this data might also be kept by the partitioned database 130 of the cashless instrument system disclosed above. In some embodiments, a universal database used to support both a player tracking system and cashless instrument system might be used. In any event, partitioned database 130 might be partitioned according to categories in addition to the gaming property partitions outlined above. In some embodiments, database partitions according to general gaming types can be made, such as, for example, one section for gaming machine related cashless instrument transactions and a separate section for gaming table related cashless instrument transactions. Other partitions can be made with respect to different players, groups of players or other individuals or groups. Further or alternative partitions might also be made with respect to separate specific game types, such as, for example, one section for blackjack and another separate section for craps. Still further or alternative database partitions might be made for general and/or specific promotions.

For example, database 130 might be partitioned along two major categories: 1) cash value transactions, and 2) promotional transactions. Within each of these major categories, two sub-categories can exist for: A) gaming machines, and B) gaming tables. Within a promotional transactions at gaming tables partition in particular, even further partitions can exist with respect to: i) roundup promotions, ii) one time bet matching promotions and iii) other table game based promotions. Still further partitions can be created with respect to groups of players such as: a) VIPs, b) player club members, c) known and suspected cheats and d) other known players. Various data items that can be recorded in association with a given player can include, for example, a player name, number, membership date and level, typical games played, typical betting levels, specific cashless instrument transaction data, specific RFID gaming chip transactional data, an establishment value rating assigned to the patron, a current or general comp level, security information, and one or more identification files, such as biometrics, still images or video clips, among others.

Tracked data can be appropriately routed to the correct partitioned portion of database 130 through various vehicles, such as by manual definitions by casino personnel entering the data and/or appropriate identifiers on the printed ticket or cashless instrument and/or at the ticket or credit issuing or accepting device. For example, part of the barcode of a printed ticket can contain a code that identifies the portion of partitioned database 130 to which tracked information is to be routed and stored. Such information can be communicated at various times, and it is specifically contemplated that reports and/or transfers of raw data can be made as each ticket is issued and as each ticket is validated.

Cashless Instrument Based Table Game Promotions

In addition to the foregoing general transactions involving printed tickets and other cashless instruments at table games, the present invention provides numerous different table game promotions involving such printed tickets and other cashless instruments. Such promotions are preferably traceable, due to the barcodes and other informational items on cashless instruments, and can also be fully or substantially automated in various ways, as noted above. In addition, the provided table game promotions can be made by using the same cashless instruments, such as, for example, a combination printed ticket, and/or by using similar cashless instruments, such as, for example, an EZ Pay® ticket having only a promotional value and no actual cash value.

In some embodiments, various traceable table game promotions can be provided by incorporating them into a new or existing EZ Pay® ticket system. Such a system can be adapted to issue not only cash value printed tickets, but also purely promotional printed tickets, as well as combination cash value and promotional tickets. As noted above, where such promotions are not combined onto a cash value printed ticket, they may be issued as a separate printed ticket by a system printer at the same time that a cash value ticket is issued, such that a player is presented with a cash value printed ticket and a promotional printed ticket at the same time. In addition, such promotional tickets can be printed out independently and provided to players in a variety of ways, such as via regular mail, e-mail, advertisements, at front desks, at hotel rooms and at the gaming venues themselves, such as at gaming machines, gaming tables, keno parlors, sports books and the like. As will be readily appreciated, other existing cashless systems may also be similarly adapted to provide similar promotional items or credits along with purely cash value items and credits. Although much of the present discussion shall focus on printed ticket systems, such as the EZ Pay® system, it will be understood that other cashless instrument systems can be similarly structured.

As noted above, promotional cashless instruments can contain unrestricted promotional credits and/or restricted promotional credits. Non-cashable credits are one example of restricted promotional credits that may be utilized in the present invention. Restricted promotional credits are credits that are limited in their use. For example, a restricted promotional credit may be limited for only game play use. Thus, a player may provide a cashless instrument with a number of promotional credits at a location where the restricted promotional credits may be used to play a game, such as but not limited to a gaming machine, a table game, a sports book, a bingo parlor and a keno parlor. If the player utilizes a portion of his or her restricted promotional credits for game play, and in addition wins at the game he or she has played, then, at cash out, the player may be issued two cashless instruments, such as two printed tickets. The first ticket may store the remaining restricted promotional credits, while the second ticket may store a cash value representing the amount of the player winnings. The first ticket may be used for additional game play only, while the first ticket may be redeemed for its cash value. In some embodiments, a single cashless instrument, such as a single ticket, may store both the restricted promotional credits and any separate cash value.

Restricted promotional credits may be limited in many different ways. For instance, restricted promotional credits may be limited to a time period (e.g., certain times of day, certain days of the week, a holiday period), a particular game (e.g., table games, sports book, keno, bingo, gaming machines, or a particular type of gaming machine or table), a particular location, or a combination of locations. Promotional credits may be also unrestricted. In this case, a cashless instrument may be issued storing promotional credits that may be redeemed for cash or for game play. A transfer to a player may include sending information and commands to a remote gaming device that allows the promotion to be generated at the remote gaming device and awarded to a player. For example, a clearinghouse or other central server may direct a remote gaming device, such as a gaming machine or a cashless interface device at a gaming table, to generate a cashless instrument, such as printed ticket, which may be redeemed for promotional credits at a given gaming venue. In particular embodiments, promotional credits, comps, discount coupons, and cash awards may be stored on a cashless instrument generated at a cashless instrument generation site that is in communication with the clearinghouse or other central server.

In another embodiment, a promotion may be stored in a specific account, such as a player account. For instance, promotional credits may be available on an account accessible to a particular user. In another yet another embodiment, a promotion may be e-mailed to a user. For instance, an electronic file containing a cashless instrument that may be printed out by a user may be sent to an e-mail address of a user. When the cashless instrument is printed out, it may be redeemed for a promotion indicated by the cashless instrument. In a further embodiment, when a mail address is available, a promotion on a cashless instrument may be mailed to a user. A clearinghouse or other central server may be capable of receiving cashless instrument validation requests for a validation of promotional credits, comps, discount coupons and cash awards stored on cashless instruments or stored in user accounts. The promotional credits, the comp, the discount coupon and the cash awards that may be stored on cashless instruments or may be stored in user accounts may be redeemable at a plurality of gaming properties in communication with the clearinghouse or other central server. As in the case of purely cash value printed tickets, the printed ticket or other cashless instrument with the stored promotion may be issued at a first gaming property and redeemed at a second gaming property.

In yet another embodiment, an associated processor may be capable of regulating access to the promotional credits stored on a cashless instrument or in a user account. The promotional credits may be regulated according to one or more of the following: i) a total amount used over a period of time, ii) a total amount used at a particular gaming property, iii) a total amount used at a particular group of gaming properties, iv) a use of the promotional credits on a particular type of gaming machine, v) a use to a particular group of gaming machines, vi) a use of the promotional credits on a particular type of gaming table, vii) a use to a particular group of gaming tables, viii) a use of promotional credits only during certain time periods, and ix) various combinations thereof, among others. The user account storing the promotional credits may be maintained at the clearinghouse, on a remote server in communication with the clearinghouse, on another form of central server, or some combination thereof.

In some embodiments, various promotional tickets can be designated for use at table games only. For example, a generic one time "bet matching" promotion can specify on the face of the ticket, "This coupon can be used to provide a bet matching value up to $10, good at any table game." As noted in the Background above, such a bet match can then be made with respect to any amount wagered by a player (up to the maximum) for one game play, after which the coupon or ticket is then removed by the dealer. Other promotional tickets might also be designated strictly for table game use. General table game promotions might include a promotion for "Free $5 in gaming chips upon buy in for $100 in gaming chips and at least one game play at any table game." More specific table game promotions might also be provided, such as a similar promotion to the foregoing, only "at any blackjack table," or "at any roulette table," and so forth. Such game specific promotions can be particularly useful where a gaming operator wishes to promote a specific new table game or a specific table game that has been experiencing decreased activity at the casino or gaming establishment.

Unlike the general fliers and newspaper clipping types of bet matching coupons and other similar promotions, however, bet matching and other promotions utilizing printed tickets or other easily traceable cashless instruments can be read at the gaming table, have their data transferred to a clearinghouse or other central server, and can be stored for any desired future sort and softcount procedure. By using traceable instruments, data regarding the issuance of the promotional tickets can be collected and tracked. Such data might possibly including the specific time, location, and medium of issuance, as well as the specific player or other person to whom the promotional ticket was issued. In some embodiments, restrictions might be made with respect to one or more of these items. For example, player specific promotions might restrict the use of the actual promotional ticket to the player to whom the ticket was issued. Using such restrictions, a casino or other gaming establishment might be able to provide more attractive promotions to some players, where it would be undesirable to present such promotions to everyone in general.

In various specific illustrative examples, the casino may generally know that a particular player only plays gaming machines, and as such may provide one or more specific promotional tickets directed to that player, such as issuing them to that player at a gaming machine. Such directed and specific promotional tickets might be in the form of, for example, a $50 maximum bet matching offer, multiple bet matching offers that may be made at consecutive game plays at the same gaming table, or an offer of "$20 worth of free casino chips to be redeemed at any craps table." Of course, such relatively generous promotional offers would most likely not be made with respect to just anyone, but rather can be made to promote table games to a loyal patron who is known not to play table games. Accordingly, upon tendering such a directed and specific promotional offer, the tendering player may be required to provide proof of identification, such as by a player tracking card issued to that player, such that other players would not be permitted to benefit from the player specific promotional offer.

Further types of specific gaming table promotional offers might also be used, and may be made specific with respect to the type of table game, a particular play at a table game (e.g., bet matching on any "odd" or "even" play at roulette), a group or region of table games, a group of players and/or the time or times when the offer may be redeemed. In some embodiments, such promotional offers may even be restricted to an exact gaming table, such as the blackjack table nearest the main door, or the only $20 pai-gow poker table in a given bank of gaming tables. Other restrictions may be made with respect to a particular time period during which redemption can be made, and/or might also include an expiration time or date on the offer, such that the gaming establishment can have more control over exactly how its promotions can be made and redeemed, to better suit its overall objectives in creating a more robust and popular gaming environment. For example, a casino may decide that certain weekdays or time periods during the afternoon are more susceptible to lulls in gaming activity, and may accordingly provide more generous promotional offers that are redeemable only during such typically low activity periods. Further, the casino may elect to restrict redemption of some or all promotional offers during particularly high activity gaming periods, such as on weekend evenings or after noteworthy sporting events, such as a boxing title fight, since promotions are generally not needed during those times to generate high levels of gaming activity across the casino.

In some embodiments, an "EZ Roundup" or other roundup promotion can be made with respect to the use of a printed ticket or other cashless instrument at the gaming table or other gaming venue. In general, a table game dealer or other suitable personnel can accept an EZ Pay® cash voucher or other printed ticket having a redeemable cash value at a gaming table or other suitable gaming venue, validates the ticket, and then rounds up the printed ticket cash value to a whole dollar amount before providing the player with gaming chips. For example, a player brings an EZ Pay® ticket having a cash value of $5.27 to a $2 blackjack table. After the player offers the ticket as a buy in, the dealer validates ticket and then provides a promotional roundup value of 73 cents. The dealer then gives the player $6 in gaming chips. Of course, other printed ticket cash values, roundup values and general roundup amounts are also possible, and it is specifically contemplated that such a roundup promotion can include any scenario where a player is provided with gaming chips, markers, tokens or items having a value greater than an accepted printed ticket or other cashless instrument as a form of buy in at a suitable gaming venue, such as a gaming table.

In general, such a roundup promotion generally promotes both the use of cashless instruments and the play of table games or other suitable games at various gaming venues adapted to accept such cashless instruments. It is anticipated that players will not only be more amenable to using cashless instruments, such as printed tickets, across the casino or other gaming establishment, but that players will also be more inclined to play games at gaming tables or other venues where promotional roundup values are provided. In addition to the various advantages gained by the gaming establishment through the more widespread use of printed tickets and other cashless instruments, as outlined above, additional time can be saved by not requiring dealers and other personnel to cash out remainders or other minute amounts on offered cashless instruments, such as pennies and other coin amounts. It is contemplated that the saved administrative time and promotional value to patrons provided by granting such promotional roundups may offset any cash value lost by the casino in granting such roundup values in many cases.

In many instances, a round up promotional value can be provided on the printed ticket or cashless instrument itself. For example, a printed ticket having a stated cash value of $53.88 might also provide the following promotional offer on its face: "If redeemed at a gaming table, holder to be provided $55 in gaming chips for gaming purposes at that gaming table, for a roundup value of $1.12." Such a promotional offer might be a prepackaged or pre-rendered type of offer, with only the actual dollar amounts changing from offer to offer, as reflected in the underlined amounts in the exemplary offer provided. Although a promo roundup to the next whole dollar amount may be an appropriate roundup value in many cases, such a roundup value need not be so limited. In some embodiments, a promotional roundup value might increase in proportion to the cash value of the printed ticket. For example, a printed ticket having a cash value of $591.00 might result in a promotional roundup offer of $4, resulting in the player receiving $595 worth of gaming chips at a buy in at a suitable gaming venue, such as a blackjack table.

In some embodiments, the promotional roundup value might be offered or provided at the gaming table orally or as an automatic courtesy, according to any policy or procedure established by the gaming establishment or particular pit area or gaming table. Such a provided roundup value at the gaming table or other gaming venue itself can be in lieu of or in addition to an express offer or value stated on the printed ticket or cashless instrument itself. For example, a given gaming establishment may institute a policy that all printed tickets are to be granted a promotional roundup value to the next full dollar amount at a minimum whenever they are used as a buy in at any gaming table. Again, such a minimum promotional roundup value eliminates any need to resort to the inconvenience of cashing out coin amounts, which can be troublesome and time consuming in comparison with the cash value gained by the casino by not providing a fractional dollar roundup in many instances. Of course, other forms of currency may also be applied, such as euros, pounds, francs, pesos, yen and the like, with roundup promotional values being applied to such alternative currencies as may be appropriate. In particular, alleviating the need to cash out minute coin amounts may be particularly advantageous with respect to any currency.

The promotional roundup value might also be linked to the type of gaming table or minimum betting level of the table. For instance, the same $591.00 printed ticket of the example above might result in a promotional roundup of $9 if offered for a buy in of chips or markers at a $100 baccarat table. Although it may be imprudent to offer such a relatively large roundup value on the face of the ticket itself, such a discretionary offer can be made at the gaming table, depending upon the circumstances. In this manner, a casino or other gaming establishment, or even a floor supervisor or dealer, might be provided with some level of discretion in the amount of promotional roundup value provided with respect to any particular promotional offer or grant. Again, varying the level of roundup value may prove advantageous to the casino or other gaming establishment depending upon the circumstances. For example, a casino may determine that it is more profitable in the long run to offer promotional roundups of $9 or less on printed tickets of $500 or more, since such offers tend to result in more extended gaming sessions rather than shorter gaming sessions, or even simple cash outs of the printed tickets and departures of potential players.

In some embodiments, particularly where a casino or gaming establishment is concerned about players who may abuse any roundup promotional privileges, such promotions may be made on a limited or conditional basis. For example, casino policy may be established that a given player may only be granted one promotional roundup in a given period, such as an hour or day, so as to prevent players from accumulating and offering numerous printed tickets for numerous promotional roundups, the sum of which may be excessive (e.g., twenty printed tickets for $9.05 cashed in for $10 each in rapid succession about the same casino, with little to no actual gaming at each table). The use or abuse of such roundup promotions can be tracked through the use of player tracking cards at the gaming tables, as well as through manual observation by dealers, pit supervisors, security and other casino personnel. In the event that a particular player or group of players is seen to be accumulating an excessive or unfair number of promotional roundups, due to irregular activities or otherwise, such player or players may be cutoff from further promotional roundups for a set period. In the event that no roundup is to be given to such a player, the player might be presented with an actual coin remainder or a second printed ticket for a remainder amount upon a subsequent buy in at a gaming table using a printed ticket.

As another precaution to limit the ability of various angle-taking players to abuse a promotional roundup system, a buy in at a gaming table may involve the use of gaming chips that cannot be redeemed for cash. Such gaming chips could be used for gaming purposes at the gaming table, such as for making wagers, but would have no value at a cashier cage or outside the casino if removed from the gaming table. For example, a promotional roundup of a $73.57 printed ticket to $80 in gaming chips may involve the player being provided with 15 regular negotiable $5 gaming chips and 1 non-negotiable promotional $5 gaming chip. Such a promotional gaming chip could be used repeatedly to make wagers at the gaming table until it is lost, with any payouts resulting from the wager of the promotional non-negotiable gaming chip being made in regular negotiable gaming chips. In other embodiments, more or all of an entire buy in of gaming chips at the gaming table may result in the provision of such non-negotiable gaming only promotional chips. Of course, such buy ins involving non-negotiable gaming chips as part of a negotiable cash value portion of a printed ticket would need to be assented to by the player, which assent might be granted due to a more favorable promotional roundup being provided to the player, particularly where the player intends to play at the gaming table for an extended period of time anyway. As will be readily appreciated, such a device of requiring all or a portion of a buy in be made in non-negotiable gaming chips thus requires the player to actually play for some period of time at the gaming table, rather than buying in for gaming chips and then leaving immediately or soon thereafter to cash out at a cashier window.

In addition to offering and providing promotional roundups at gaming tables and other suitable gaming venues, such promotional roundup amounts can be tracked and data forwarded to a clearinghouse, database or other central server for future reference and analysis. Such data tracking can be similar to and even made on the same system used for tracking cashless transactions using cashless instruments having actual cash values. Various details for such data tracking, storage, database use and future reference are provided above with respect to the cashless instrument transaction clearinghouse and associated partitioned database. Again, such a database may be partitioned according to promotional type and even various distinctions within a given promotional type. For example, partitions to the database may be made with respect to express roundup offers made and accepted on printed themselves versus discretionary roundup offers that are made and accepted at the table without such a ticket or instrument providing the roundup offer expressly. As will be appreciated, a separate additional module or modules can be added to an existing or new cashless instrument system, such as an EZ Pay® system, in order to manage and track the offering, validation and tracking of such roundup promotional tickets.

Figure 8:
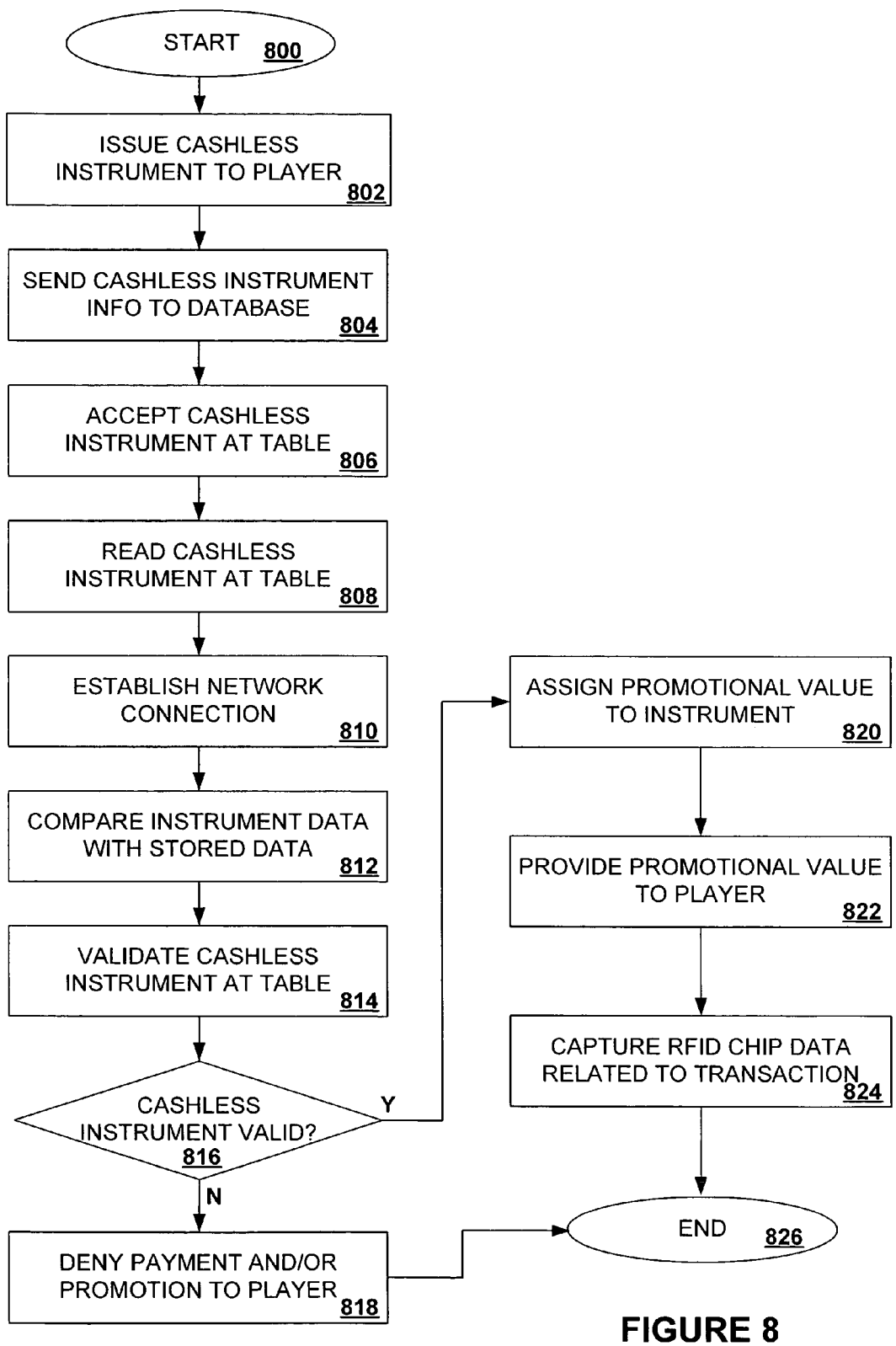
FIG. 8 is a flowchart conveying an exemplary method of providing a roundup promotion related to the use of a cashless instrument at a gaming table according to one embodiment of the present invention.

Turning lastly to FIG. 8, a flowchart conveying an exemplary method of providing a roundup promotion related to the use of a cashless instrument at a gaming table according to one embodiment of the present invention is shown. While this flowchart may be comprehensive in some respects, it will be readily understood that not every step provided is necessary, that other steps can be included, and that the order of steps might be rearranged as desired by a given gaming operator or other pertinent party. After start step 800, a cashless instrument is issued to a player at a process step 802. While such a cashless instrument can be a printed ticket, such as an EZ Pay® ticket voucher or other similar item, it is specifically contemplated that a wide variety of other cashless instruments may also be used. Further, such a printed ticket or other cashless instrument may be issued from a gaming machine, a cashier cage, a gaming table, or any of a variety of other suitable cashless instrument issuing devices and/or locations, as will be readily appreciated. Upon issuance of the ticket or other cashless instrument, information or data specific to the ticket or instrument is sent to a system database or other suitable storage location at process step 804.

Later, when the player desires to use the cashless instrument at a gaming table, such a cashless instrument is accepted at the gaming table at process step 806. In some situations, the accepting gaming table may even be the same venue at which the cashless instrument was issued. Upon accepting the ticket or other cashless instrument at the gaming table, the ticket or instrument is read by a suitable automated reading device, such as a cashless interface device at process step 808. At process step 810, a network connection can be established between the reading device and a cashless instrument network, such as where the database from step 804 may be located. Although located here for purposes of illustration, it will be appreciated that a network connection may already be established between the reading device and the network containing the database, such that step 810 in particular may occur earlier in the provided process. At process step 812, data read from the cashless instrument is compared to stored data regarding the cashless instrument or a general promotion relating to the instrument, after which the instrument is validated at process step 814.

At decision step 816, an inquiry is made as to whether the cashless instrument is indeed valid. If not, then the method continues to process step 818 where a denial of any payment or promotion is made, after which the method then ends at end step 826. If the cashless instrument is valid, however, then a promotional value can be assigned to the instrument at process step 820. Such a promotional value may be one that is already expressly printed on the instrument, can be an adjustment to such an expressly provided value, can be a discretionary value that is provided at the gaming table or venue, or can be some combination thereof. Subsequently, the promotional value is provided to the player at process step 822. In addition, any transaction involving the movement of gaming chips containing RFID chips may have further data related to such gaming chips movement captured at process step 824, after which the method then ends at end step 826. Again, various details and additional steps may similarly be included, not all steps discussed herein may be practiced in a given embodiment, and it is specifically contemplated that many variations of this exemplary promotional method may also be practiced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A system adapted for use in conjunction with live table games involving the acceptance of monetary wagers, the play of games based on said monetary wagers and the grant of monetary awards based on the outcomes of said wager based games, said system comprising:

a cashless instrument transaction clearinghouse adapted to facilitate the use of cashless instruments at one or more gaming properties adapted to generate and accept cashless instruments, said cashless instrument transaction clearinghouse including:

at least one network interface allowing the cashless instrument transaction clearinghouse to communicate with each of said one or more gaming properties, a processor configured to receive via said network interface cashless instrument validation requests and send information via said network interface regarding approvals, rejections, or both with respect to said cashless instrument validation requests, and a transaction database containing cashless instrument transaction information; and a plurality of cashless interface devices at a plurality of live gaming tables, said plurality of live gaming tables being used to host live table games involving the acceptance of monetary wagers, the play of games based on said monetary wagers and the grant of monetary awards based on the outcomes of said wager based games, wherein each of said plurality of cashless interface devices is in communication with said cashless instrument transaction clearinghouse and is adapted to:

read cashless instrument information from one or more cashless instruments, validate the one or more cashless instruments thereupon, communicate the cashless instrument information to said clearinghouse, facilitate a conversion of said one or more cashless instruments to gaming chips at said plurality of live gaming tables, facilitate the redemption of one or more promotional awards made with respect to at least one of said live table games, said one or more promotional awards being presented on a machine readable medium, one or more of said promotional awards being embodied in traceable printed tickets or vouchers that are machine readable for transfer of information thereon to said clearinghouse for tracking; and generate a table game roundup promotion given for redeeming a cashless instrument when used in a live table game, wherein said table game roundup promotion comprises:

reading first cashless instrument information from a first cashless instrument wherein the first cashless instrument was issued with a first value amount, after validating the first value amount associated with the first cashless instrument, determining a second value amount wherein the second value amount is greater than the first value amount by an unearned promotional roundup amount applicable for play with respect to at least one of said live table games by redeeming said first cashless instrument for play in said at least one of said live table games, and authorizing a redemption of the first cashless instrument at the second value amount for play in said at least one of said live table games if said first cashless instrument is surrendered at said at least one of said live table games.

2. The system of claim 1, wherein said system comprises a wide area network situated across multiple gaming establishments.

3. The system of claim 1, wherein said one or more cashless instruments include at least one cashless instrument selected from the group consisting of a magnetic stripe card, a printed ticket, and a bar-coded ticket.

4. The system of claim 1, wherein each of said plurality of cashless interface devices is further adapted to facilitate the conversion of gaming chips to at least one cashless instrument at said plurality of live gaming tables.

5. The system of claim 4, wherein said at least one cashless instrument reflecting a conversion from gaming chips is separate from said one or more cashless instruments resulting in a conversion to gaming chips.

6. The system of claim 4, wherein at least one of said plurality of cashless interface devices is adapted to generate a first cashless instrument reflecting a conversion from gaming chips to said first cashless instrument.

7. The system of claim 6, said at least one cashless interface device adapted to generate a first cashless instrument comprises a ticket printer.

8. The system of claim 1, wherein said transaction database comprises a partitioned database containing cashless instrument transaction information separated with respect to one or more classifications selected from the group consisting of ownership of gaming properties, gaming machine cashless instrument transactions, gaming table cashless instrument transactions, overall gaming table promotional transactions and gaming table promotional roundup transactions.

9. The system of claim 1, wherein at least one of said live table games includes at least one live player and at least one live employee of the gaming establishment providing said live table game.

10. A system adapted for use in conjunction with live table gaming venues involving the acceptance of monetary wagers, the play of games based on said monetary wagers and the grant of monetary awards based on the outcomes of said wager based games, the system comprising:

a processor configured to receive validation requests regarding cashless instruments issued by one or more cashless instrument generating devices and to send information regarding approvals, rejections, or both with respect to said cashless instrument validation requests, said cashless instruments having cash values;

a transaction database in communication with said processor and containing cashless instrument transaction information; and a plurality of cashless interface devices at a plurality of live table gaming venues, said plurality of live table gaming venues being used to host live gaming events involving the acceptance of monetary wagers, the display of games or sporting events based on said monetary wagers and the grant of monetary awards based on the outcomes of said wager based gaming events, wherein one or more of said plurality of cashless interface devices is in communication with said processor and is adapted to:

read cashless instrument information from one or more cashless instruments, validate the one or more of said cashless instruments thereupon, communicate the cashless instrument information to said database, facilitate a conversion of said one or more cashless instruments to one or more other forms of gaming credit at one or more of said plurality of live table gaming venues, and generate a table game roundup promotion given for redeeming a cashless instrument when used in a live table game, wherein said table game roundup promotion comprises:

reading first cashless instrument information from a first cashless instrument selected from traceable printed tickets or vouchers wherein the first cashless instrument was issued with a first value amount, after validating the first value amount associated with the first cashless instrument, determining a second value amount wherein the second value amount is greater than the first value amount by an unearned promotional roundup amount applicable for play with respect to at least one of said live table games by redeeming said first cashless instrument for play in said at least one of said live table games, and authorizing a redemption of the first cashless instrument at the second value amount for play in said at least one of said live table games if said first cashless instrument is surrendered at said at least one of said live table games.

11. The system of claim 10, wherein at least one of said cashless instrument generating devices comprises a gaming machine.

12. The system of claim 10, wherein said one or more other forms of gaming credit are selected from the group consisting of one or more gaming chips, keno tickets, credits stored on a smart card, credits stored on a magnetic stripe card, credits stored on a debit card, and a bar-coded ticket.

13. The system of claim 10, wherein said plurality of live table gaming venues comprise gaming tables adapted to play one or games selected from the group consisting of blackjack, poker, craps, roulette, baccarat, pai-gow poker, pai-gow tiles, Carribean Stud, Spanish 21, and Let It Ride.

14. The system of claim 10, wherein said one or more of said plurality of cashless interface devices is further adapted to facilitate the redemption of one or more promotional offers made with respect to at least one of said live table gaming events, said one or more promotional offers being presented on a machine readable medium.

15. The system of claim 10, wherein said first value amount comprises a monetary value that requires the use of coins for a full conversion to currency, and wherein said second value amount comprises a monetary value that does not require the use of coins for a full conversion to currency.

16. The system of claim 10, wherein said one or more other forms of gaming credit comprises gaming chips acceptable for play at a gaming table.

17. The system of claim 16, wherein said one or more of said plurality of cashless interface devices is further adapted to facilitate the conversion of said gaming chips to at least one cashless instrument at said plurality of live table gaming venues.

18. The system of claim 17, wherein said at least one cashless instrument reflecting a conversion from gaming chips is separate from said one or more cashless instruments resulting in a conversion to gaming chips.

19. The system of claim 10, wherein said transaction database comprises a partitioned database containing cashless instrument transaction information separated with respect to one or more classifications selected from the group consisting of gaming machine cashless instrument transactions, gaming table cashless instrument transactions, overall gaming table promotional transactions and gaming table promotional roundup transactions.

20. The system of claim 10, wherein said one or more cashless instruments include at least one cashless instrument selected from the group consisting of a magnetic stripe card, a printed ticket, and a bar-coded ticket.

21. A method of providing a cashless instrument related promotion at a gaming table hosting live table games, comprising:

administering the play of a wager-based game at said gaming table;

accepting a cashless instrument selected from traceable printed tickets or vouchers from a player at said gaming table, said gaming table adapted to host at least one live table game involving the acceptance of monetary wagers, the play of games based on said monetary wagers and the grant of monetary awards based on the outcomes of said games;

reading said cashless instrument using an automated cashless interface device located at or in close proximity to said gaming table, wherein said reading step includes reading a machine readable portion of said cashless instrument;

validating said cashless instrument based on said machine readable portion of said cashless instrument using said automated cashless interface device;

assigning an unearned promotional monetary value to said cashless instrument, said promotional monetary value given for redeeming a cashless instrument when surrendered by a player in a live table game and being in addition to any actual negotiable cash value that may be attributable to said cashless instrument and redeemable with said cashless instrument for play at said gaming table; and providing to said player at said gaming table one or more items or gestures reflecting said promotional monetary value.

22. The method of claim 21, wherein said one or more items or gestures reflecting said promotional monetary value also comprise at least a portion of any actual negotiable cash value that may have been attributable to said cashless instrument.

23. The method of claim 21, wherein said one or more items or gestures reflecting said promotional monetary value comprises the placement of said cashless instrument at said gaming table to reflect a particular form of promotional offer or wager.

24. The method of claim 21, wherein said promotional monetary value comprises a promotional roundup value with respect to an actual negotiable cash value attributable to said cashless instrument.

25. The method of claim 21, wherein said validating step includes establishing a network connection and comparing said machine readable portion of said cashless instrument with information stored on an associated network component.

26. The method of claim 21, further including the step of:
providing at said gaming table one or more gaming chips reflecting a buy in with respect to an actual negotiable cash value of said cashless instrument.

27. The method of claim 21, further including the step of:
capturing with an RFID reading device gaming chip RFID data of at least one player, at least one activity or a combination thereof at said gaming table.

* * * * *